US009320067B2

(12) United States Patent  
Ho et al.

(10) Patent No.: US 9,320,067 B2  
(45) Date of Patent: Apr. 19, 2016

(54) CONFIGURATION OF USER EQUIPMENT FOR PEER-TO-PEER COMMUNICATION

(75) Inventors: Saiyiu D. Ho, San Diego, CA (US); Gavin Bernard Horn, La Jolla, CA (US); Miguel Griot, San Diego, CA (US); Nagendra Nagaraja, Bangalore Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 13/333,923

(22) Filed: Dec. 21, 2011

(65) Prior Publication Data

US 2012/0163235 A1 Jun. 28, 2012

Related U.S. Application Data

(63) Continuation-in-part of application No. 12/276,865, filed on Nov. 24, 2008.

(60) Provisional application No. 61/426,154, filed on Dec. 22, 2010.

(51) Int. Cl.
*H04W 76/02* (2009.01)
*H04B 7/02* (2006.01)
(Continued)

(52) U.S. Cl.
CPC ............ *H04W 76/023* (2013.01); *H04B 7/022* (2013.01); *H04L 67/104* (2013.01); *H04L 67/1061* (2013.01); *H04W 52/383* (2013.01); *H04W 48/16* (2013.01)

(58) Field of Classification Search
None
See application file for complete search history.

(56) References Cited

U.S. PATENT DOCUMENTS 7,013,158 B1 * 3/2006 Cook ............................ 455/519
7,016,673 B2 3/2006 Reddy et al.
(Continued)

FOREIGN PATENT DOCUMENTS

CN 1666443 A 9/2005
CN 101151859 A 3/2008
(Continued)

OTHER PUBLICATIONS

Author Unknown, Definition of E-UTRA as retrieved from Wikepedia, http://en.wikipedia.org/wiki/E-UTRA, on Sep. 19, 2014, p. 1.*

(Continued)

*Primary Examiner* — Christopher Crutchfield
(74) *Attorney, Agent, or Firm* — Novak Druce Connolly Bove + Quigg LLP

(57) ABSTRACT

Configuring a peer-to-peer (P2P) link in a multi-access wireless network includes receiving P2P configuration information from a base station at a UE supporting P2P communication. The first UE communicates directly with a second UE based on the P2P configuration information received from the base station. The first UE may send a configuration request message to the base station, and receive a responsive configuration message with the P2P configuration information from the base station, which messages may be Radio Resource Control (RRC) messages supporting P2P. In the alternative, the P2P configuration information may be provided in a system information block (SIB) broadcast by the base station. The P2P configuration information may indicate allocation of physical layer or Medium Access Control resources, or both allocated for P2P communication, and other information.

36 Claims, 14 Drawing Sheets

(51) Int. Cl.
  *H04W 52/38* (2009.01)
  *H04L 29/08* (2006.01)
  *H04W 48/16* (2009.01)

(56) References Cited

U.S. PATENT DOCUMENTS

| | | | |
|---|---|---|---|
| 8,194,600 | B2 | 6/2012 | Nagaraja |
| 8,310,978 | B2 | 11/2012 | Itagaki et al. |
| 2004/0179660 | A1 | 9/2004 | Sammon et al. |
| 2005/0102365 | A1 | 5/2005 | Moore et al. |
| 2005/0169219 | A1* | 8/2005 | Serpa et al. ............... 370/338 |
| 2006/0259958 | A1 | 11/2006 | Jennings et al. |
| 2007/0037578 | A1 | 2/2007 | Besterman |
| 2007/0072591 | A1 | 3/2007 | McGary et al. |
| 2007/0230423 | A1* | 10/2007 | Yoshida et al. ............ 370/338 |
| 2007/0253340 | A1 | 11/2007 | Varney et al. |
| 2007/0294397 | A1 | 12/2007 | Kunz |
| 2009/0119400 | A1 | 5/2009 | Fukazawa |
| 2009/0225883 | A1* | 9/2009 | Orlik et al. ............... 375/260 |
| 2010/0070760 | A1 | 3/2010 | Vanderveen et al. |
| 2010/0115195 | A1 | 5/2010 | Pong |
| 2010/0128701 | A1 | 5/2010 | Nagaraja |
| 2010/0165882 | A1 | 7/2010 | Palanki et al. |
| 2010/0183031 | A1* | 7/2010 | Dalsgaard et al. ........ 370/474 |
| 2010/0191831 | A1 | 7/2010 | Moon et al. |
| 2010/0260093 | A1 | 10/2010 | Liu et al. |
| 2010/0302958 | A1* | 12/2010 | Wietfeldt et al. ......... 370/252 |
| 2011/0228666 | A1 | 9/2011 | Barbieri et al. |
| 2012/0011247 | A1* | 1/2012 | Mallik ............ H04W 8/005 709/224 |
| 2012/0093098 | A1* | 4/2012 | Charbit et al. ............ 370/329 |

FOREIGN PATENT DOCUMENTS

| | | | | |
|---|---|---|---|---|
| EP | 1333627 | * | 8/2003 | ............ H04L 12/56 |
| EP | 1333627 | A1 | 8/2003 | |
| JP | 2006522533 | A | 9/2006 | |
| JP | 2008510344 | A | 4/2008 | |
| WO | 0115387 | A1 | 3/2001 | |
| WO | 2004006468 | A1 | 1/2004 | |
| WO | 2004077918 | A2 | 9/2004 | |
| WO | 2005053347 | A1 | 6/2005 | |
| WO | 2006016331 | A1 | 2/2006 | |
| WO | 2007055993 | A1 | 5/2007 | |
| WO | 2008046143 | A1 | 4/2008 | |
| WO | 2009009452 | | 1/2009 | |
| WO | 2010028690 | A1 | 3/2010 | |
| WO | 2010030516 | | 3/2010 | |
| WO | 2010059824 | | 5/2010 | |
| WO | WO 2010049801 | * | 5/2010 | ............ H04W 72/04 |
| WO | 2010078271 | A2 | 7/2010 | |
| WO | 2010144826 | A1 | 12/2010 | |
| WO | 2011039718 | A1 | 4/2011 | |

OTHER PUBLICATIONS

Author Unknown, Techopedia definition of Peer discovery as retrieved from Techopedia, http://www.techopedia.com/definition/25772/peer-discovery, on Sep. 19, 2014, p. 1.*

3GPP TR 21.905 V11.0.1 (Dec. 2011), 3rd Generation Partnership Project; Technical Specification Group Services and System Aspects; Vocabulary for 3GPP Specifications (Release 11).

Agrawal D., et al., "Issues in integrating cellular networks, wlans, and manets: a futuristic heterogeneous wireless network" IEEE Personal Communications, IEEE Communications Society, US, vol. 12, No. 3, Jun. 1, 2005, pp. 30-41.

International Search Report and Written Opinion—PCT/US2011/066975—ISA/EPO—Apr. 26, 2012.

Doppler, K., Rhinne, J., Wijting, C., Ribeiro, C., Hugl, K., Device-to-device communication as an underlay to LTE-advanced networks, Communications Magazine, IEEE, Dec. 2009, vol. 47(12), pp. 42-49.

* cited by examiner

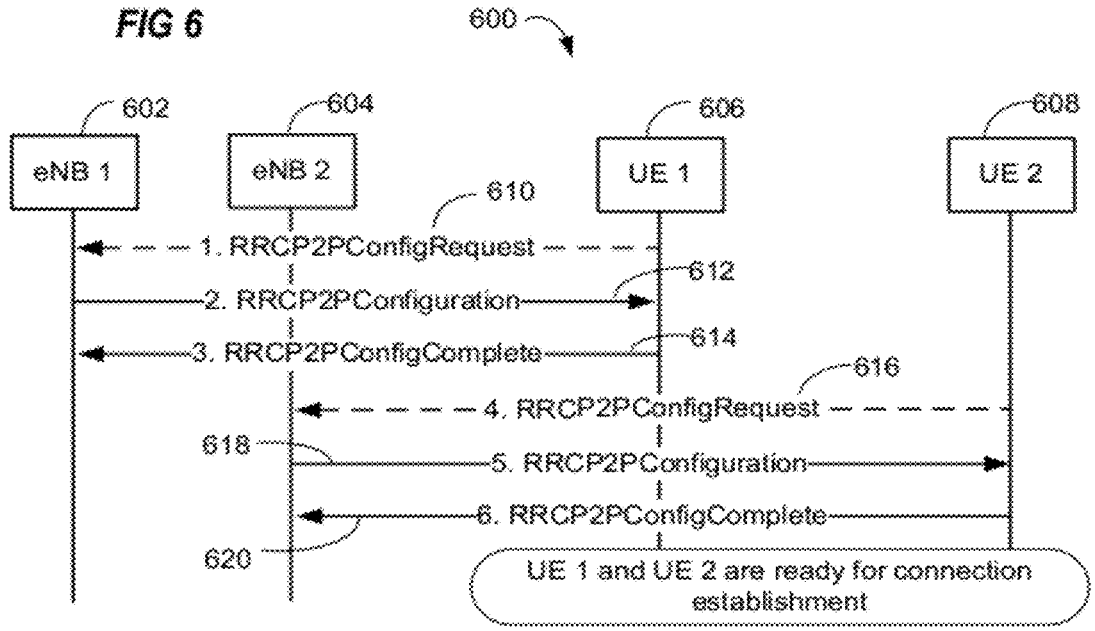
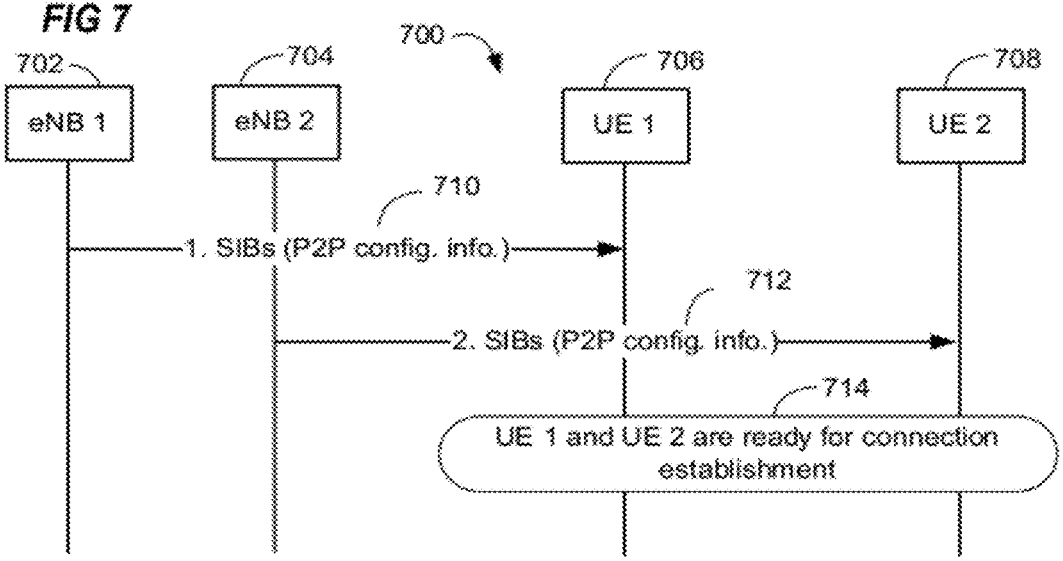

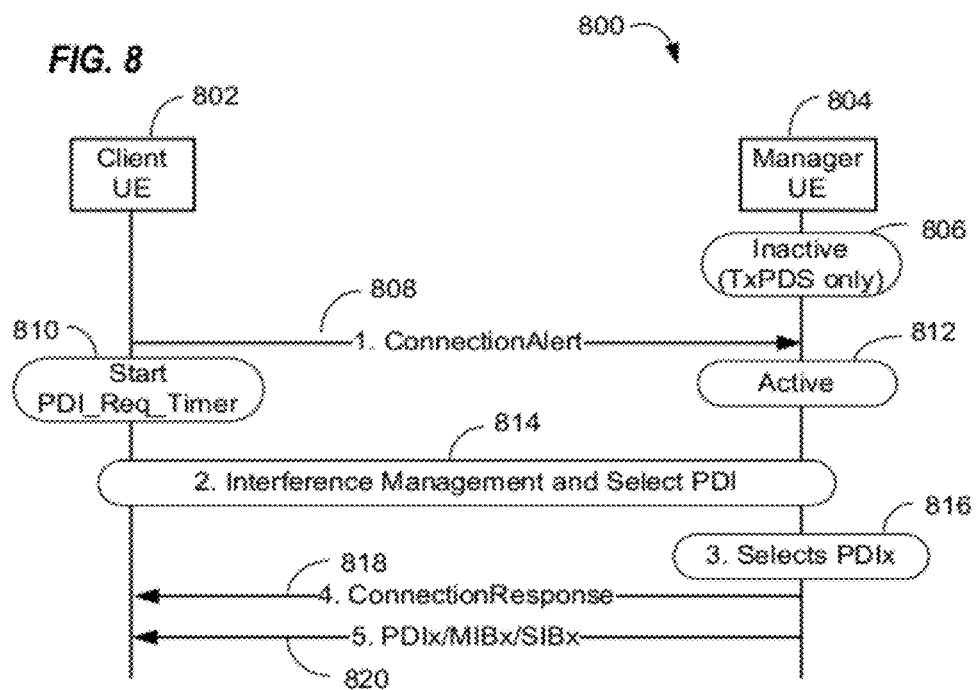
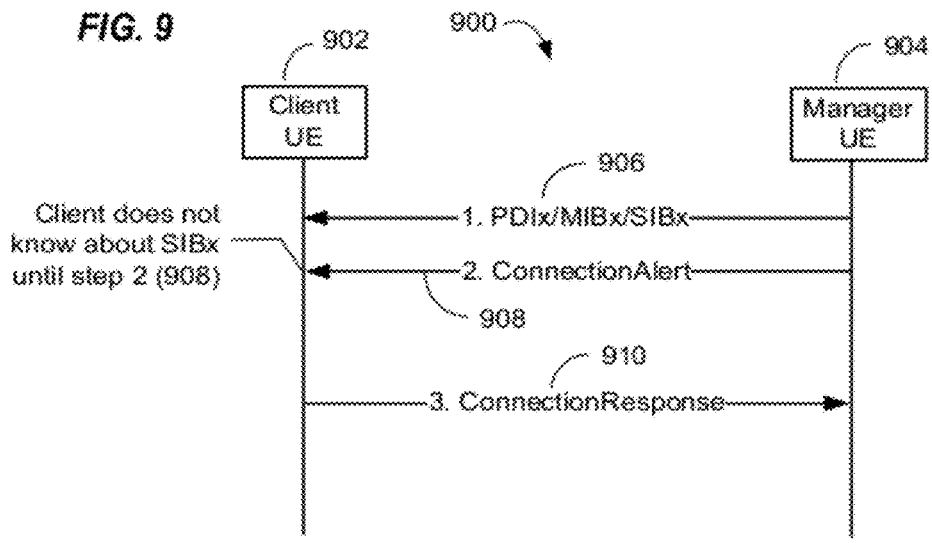

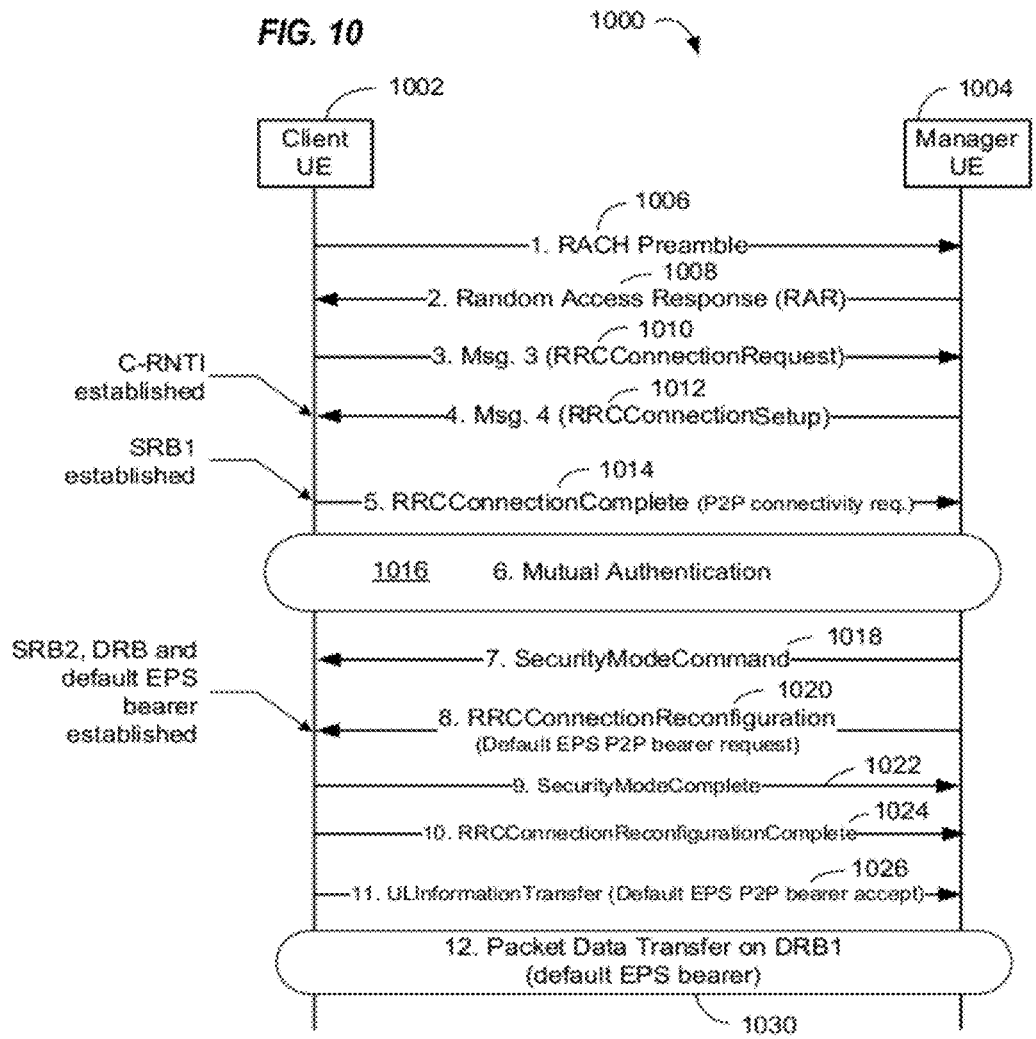

FIG. 13

| Example Use Case | Service ID | Device ID |
|---|---|---|
| Advertising a general service such as a printer, Internet access, etc. | Managed | Unrestricted |
| Advertising a multi-player game that allows connectivity with any player. Restricted if only devices with the game installed can identify the game. | Managed/ Unmanaged | Restricted/ Unrestricted |
| Advertising a social networking application such as Facebook or Skype where only friends/contacts recognize the user/device. Restricted if only registered Facebook or Skype users can identify the application. | Managed/ Unmanaged | Restricted/ Unrestricted |

FIG. 14

1402: RECEIVE P2P CONFIGURATION INFORMATION FROM A BASE STATION AT A FIRST UE, THE P2P CONFIGURATION INFORMATION SUPPORTING P2P COMMUNICATION FOR AT LEAST ONE UE WITHIN THE COVERAGE OF THE BASE STATION

1404: COMMUNICATE DIRECTLY WITH A SECOND UE BY THE FIRST UE BASED ON THE P2P CONFIGURATION INFORMATION

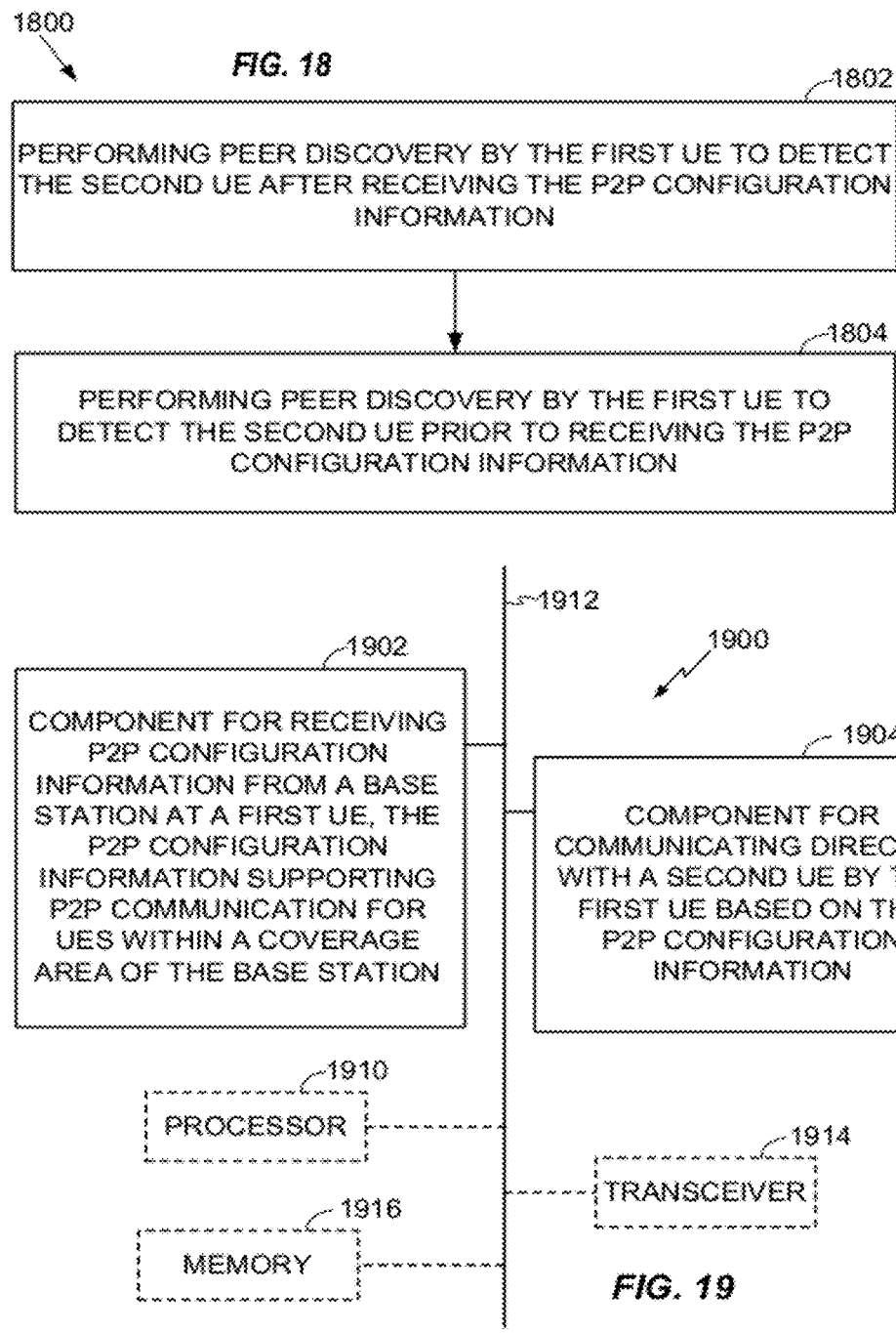

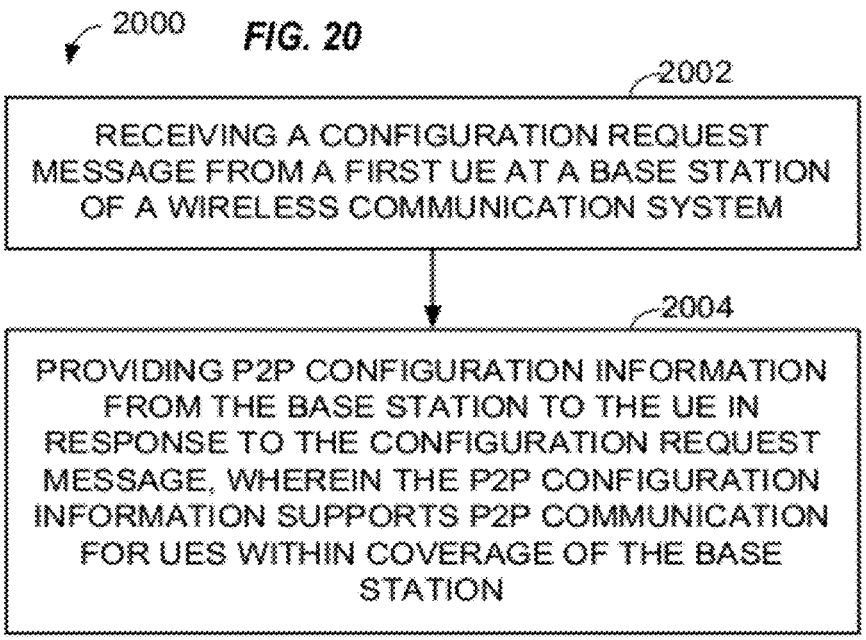
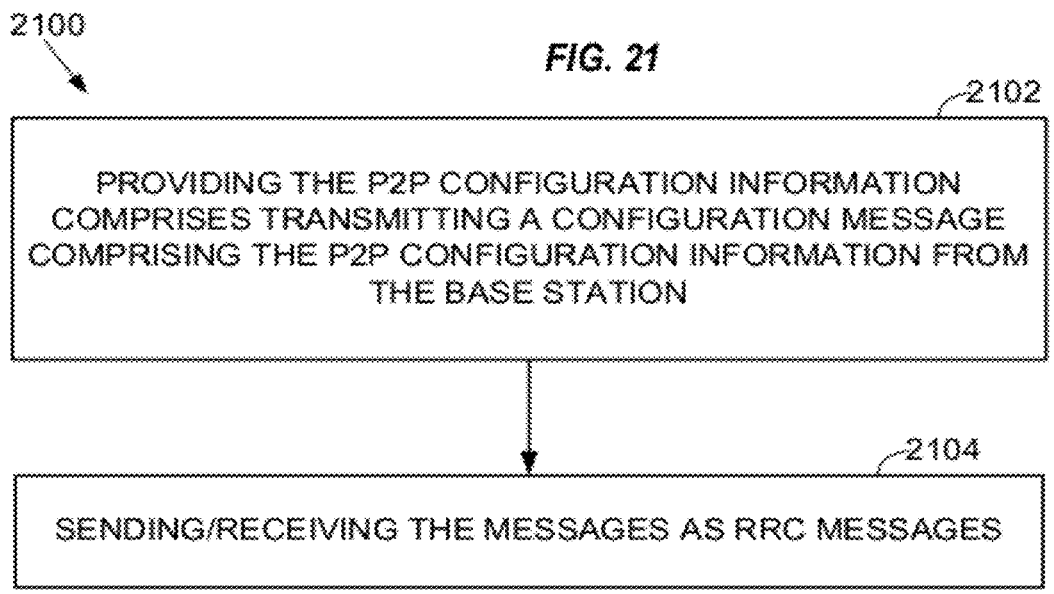

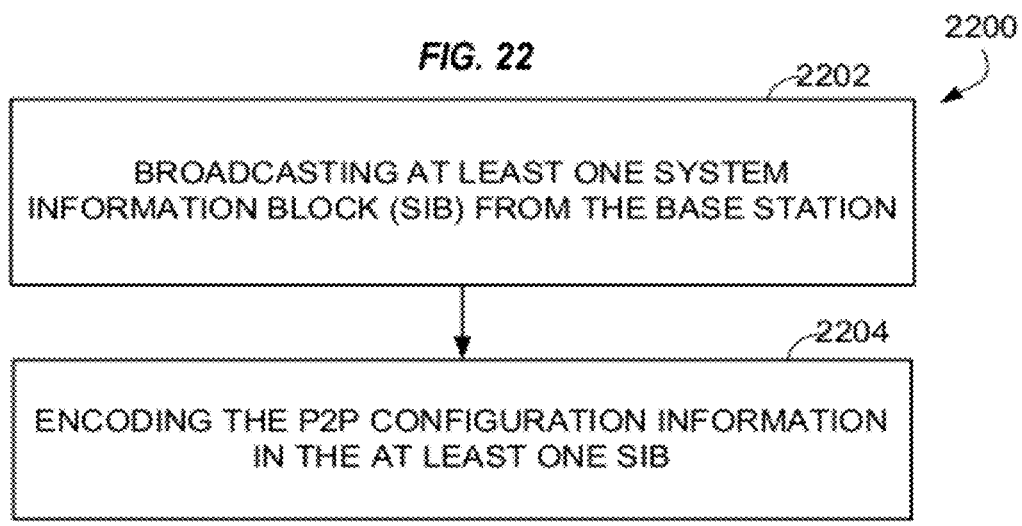
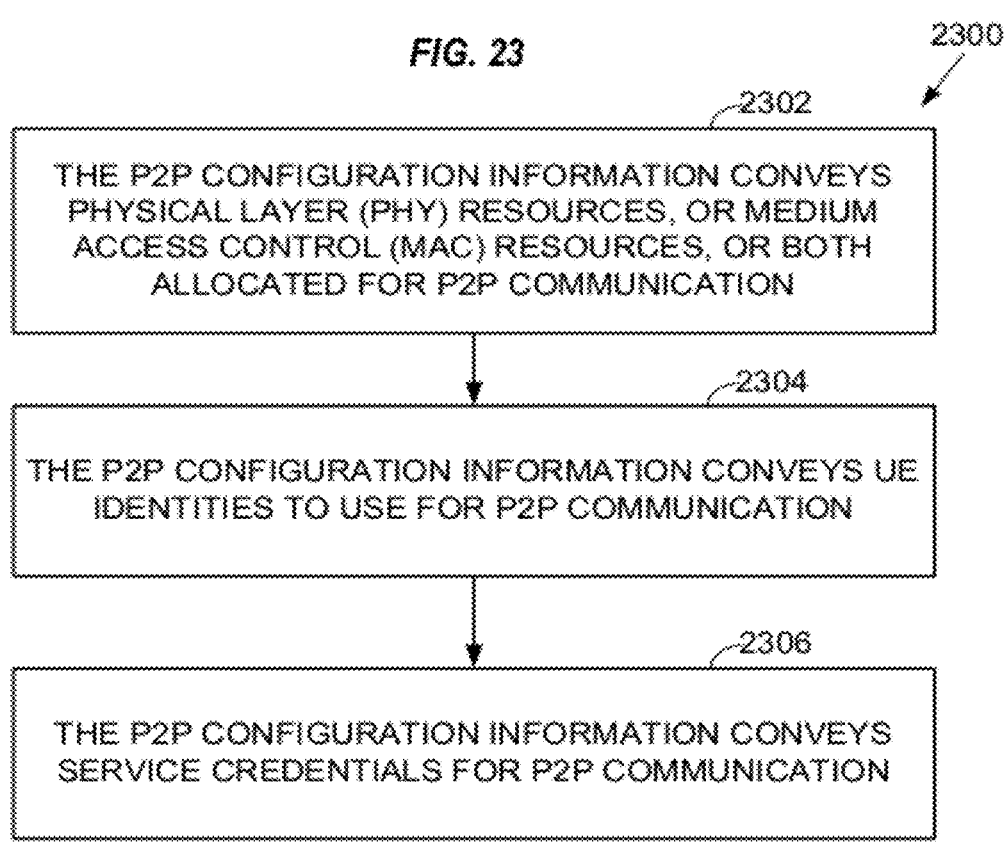

CONFIGURATION OF USER EQUIPMENT FOR PEER-TO-PEER COMMUNICATION

CROSS-REFERENCE TO RELATED APPLICATIONS

This application is a continuation-in-part of application Ser. No. 12/276,865 filed Nov. 24, 2008, and claims priority pursuant to 35 U.S.C. §119(e) to U.S. provisional application Ser. No. 61/426,154, filed Dec. 22, 2010, which applications are hereby incorporated by reference in their entireties.

FIELD

The present disclosure relates generally to communication, and more specifically to techniques for supporting peer-to-peer (P2P) communication.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipment devices (UEs). A UE may communicate with a base station via the downlink and uplink. The downlink (or forward link) refers to the communication link from the base station to the UE, and the uplink (or reverse link) refers to the communication link from the UE to the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple-access wireless communication systems supporting wireless communication between base stations and user equipment may also support wireless peer-to-peer (P2P) communications directly between user equipment devices without any intervening base station. One aspect of supporting P2P wireless communications may include P2P discovery and configuration of a P2P link. A first UE may discover and select a second UE for P2P communications using various methods. In a multiple access communication system, the problem of discovering P2P neighbors and suitably configuring P2P links may involve complex considerations without readily apparent optimal solutions. The present disclosure describes methods and aspects of P2P configuration that may prove advantageous for promoting efficiency and service quality in a modern multiple-access wireless communications system.

In accordance with one or more aspects and corresponding disclosure thereof, various aspects are described in connection with configuring a peer-to-peer link between UEs according to one or more methods. In an aspect, a method for configuring a P2P link may include receiving P2P configuration information from a base station at a UE, wherein the P2P configuration information supports P2P communication for UEs within coverage of the base station. The method may further include the first UE wirelessly communicating directly with a second UE based on the P2P configuration information received from the base station.

In certain embodiments of the method, receiving P2P configuration information may further include sending a configuration request message from the first UE to the base station, and receiving a configuration message comprising the P2P configuration information from the base station. In a more detailed aspect, the configuration request message and the configuration message comprise Radio Resource Control (RRC) messages supporting P2P.

In alternative embodiments of the method, receiving P2P configuration information may further include receiving at least one system information block (SIB) broadcast by the base station, and obtaining the P2P configuration information from the at least one SIB.

In a more detailed aspect of the method, the P2P configuration information received from the base station conveys physical layer (PHY) resources, or Medium Access Control (MAC) resources, or both allocated for P2P communication. The base station may therefore allocate PHY and/or MAC resources for one or more instances of P2P communication involving at least one UE in the coverage area of the base station.

In another aspect, the P2P configuration information received from the base station conveys UE identities to use for P2P communication. The first UE may therefore discover UE neighbors that are candidates for participating in a P2P link from the base station. In another aspect of the method, the P2P configuration information from the base station conveys service credentials for P2P communication. In another aspect of the method, the P2P configuration information is received by the first UE at a time selected by the first UE.

In an aspect, the method may further include performing peer discovery by the first UE to detect the second UE after receiving the P2P configuration information. In the alternative, or in addition, the method may further include performing peer discovery by the first UE to detect the second UE prior to receiving the P2P configuration information. The base station that supplies the P2P configuration information may be a macro base station for a macro cell, a home base station for a femto cell, or another similar type of base station.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as UEs or access terminals of various types used for wireless communications. Similarly, an article of manufacture may be provided, including a non-transitory computer-readable medium holding encoded instructions that when executed by a processor, cause a wireless communications apparatus to perform the methods and aspects of the methods as summarized above.

BRIEF DESCRIPTION OF THE DRAWINGS

The features, nature, and advantages of the present disclosure will become more apparent from the detailed description set forth below when taken in conjunction with the drawings described below. Throughout the drawings and detailed description, like reference characters may be used to identify like elements appearing in one or more of the drawings.

FIG. 6 is a sequence diagram showing aspects of a method for pre-connection establishment based on unicast signaling.

FIG. 7 is a sequence diagram showing aspects of a method for pre-connection establishment based on broadcast signaling.

FIG. 8 is a sequence diagram showing aspects of a method for pre-connection setup.

FIG. 9 is a sequence diagram showing aspects of an alternative method for pre-connection setup.

FIG. 10 is a sequence diagram showing aspects of a method for direct connection setup.

FIG. 13 is a table listing some example use cases for managed and unmanaged PDCs and restricted and unrestricted device IDs.

FIG. 14 is a block diagram showing aspects of a method for configuring UEs for P2P communication.

FIGS. 15-18 are block diagrams showing additional operations or aspects related to the method shown in FIG. 14.

FIG. 19 is a block diagram showing aspects of an apparatus for configuring a P2P link in a wireless communications system.

FIG. 20 is a block diagram showing aspects of a method for providing P2P configuration information to a UE for configuring a P2P communication.

FIGS. 21-23 are block diagrams showing additional operations or aspects related to the method shown in FIG. 20.

DETAILED DESCRIPTION

Figure 1:
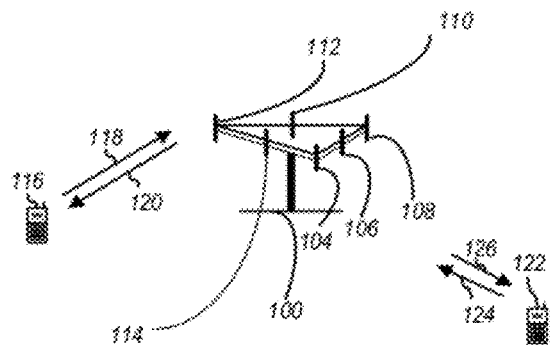
FIG. 1 shows a multiple access wireless communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may, in some embodiments, be practiced while omitting certain specific details.

Techniques for supporting P2P communication are described herein. These techniques may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. By way of example only, certain aspects of the techniques are described below for LTE, and LTE terminology is used in much of the description below.

User equipment devices are not peers of base stations or network entities of the wireless communication system, and communications between user equipment and base stations or network entities are not within the meaning of a P2P communication as used herein. Instead, the term "P2P" is used herein to refer exclusively to communications between user equipment devices that are each characterized by being mobile entities supporting a wireless interface for communication with base stations of the wireless communications network, while lacking capability for communication over a wired connection to any network entity, at least while participating in the P2P communications. Accordingly, communications involving base stations and network entities having a capability for communicating over a wired connection to other nodes of the wireless communications system are excluded from the meaning of "P2P communications" as used herein, regardless of whether or not entities participating in such communications can be considered peers. It should be apparent that user equipment may be further distinguished from other entities of the wireless communication system by including user interface components for outputting data received as digital data from a base station in analog form via a user interface device directly to a user, and for receiving user input data (e.g., voice, image, keystroke or touchscreen input) via one or more user interfaces including an analog-to-digital conversion of user input, and providing digital data from such user input to a base station. Such other entities (e.g., non-user equipment) generally lack such components, or may include user interface components primarily for supporting network administration functions.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Aspects of the present disclosure may be adapted for use in a network that includes macro scale coverage (e.g., a large area cellular network such as a 3G networks, typically referred to as a macro cell network) and smaller scale coverage (e.g., a residence-based or building-based network environment). As a UE, also called an access terminal ("AT"), moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell operated by a macro node, a femto node, or a pico node may be referred to as a macro cell, a femto cell, or a pico cell, respectively. In some implementations, each cell may be divided into one or more sectors. In 3GPP, the term "cell" may refer to a coverage area of an eNB and/or an eNB subsystem serving this coverage area, depending on the context in which the term is used.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, femto access point, and so on.

Referring to FIG. 1, a multiple access wireless communication system according to one embodiment is illustrated. An access point 100 (AP) may include multiple antenna groups, for example one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink 120 and receive information from access terminal 116 over uplink 118. Access terminal 122 is in communication with antennas 106 and 108, where antennas 106 and 108 transmit information to access terminal 122 over downlink 126 and receive information from access terminal 122 over uplink 124. In a Frequency Division Duplex (FDD) system, communication links 118, 120, 124 and 126 may use different frequencies for communication. For example, downlink 120 may use a different frequency then that used by uplink 118. The term "forward link" is synonymous with "downlink," while "reverse link" is synonymous with "uplink." While any of these terms may be used interchangeably with its synonym, the terms "uplink" and "downlink" may be favored when discussing LTE or A-LTE implementations.

Each group of antennas and/or the area in which they are designed to communicate is often referred to as a sector of the access point. In the illustrated system, antenna groups each are designed to communicate to access terminals in a sector, of the areas covered by access point 100.

In communication over downlinks 120 and 126, the transmitting antennas of access point 100 may utilize beam forming in order to improve the signal-to-noise ratio of downlinks for the different access terminals 116 and 124. An access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNB), macro cell, macro cell base station or some other terminology. An access terminal may also be called an mobile entity, user equipment, a wireless communication device, terminal, or some other terminology.

Figure 2:
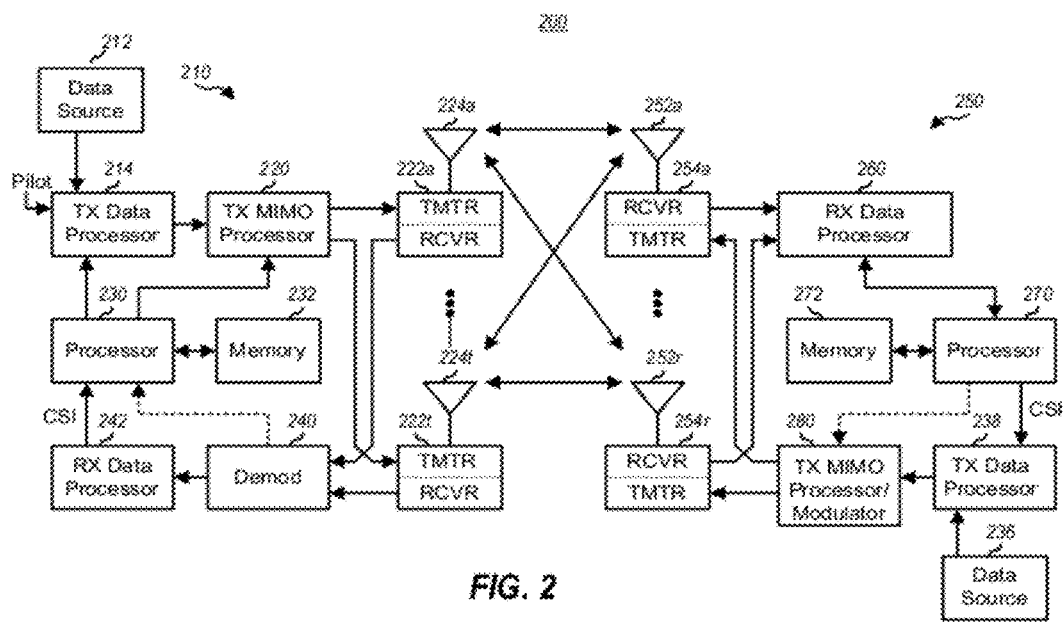
FIG. 2 is a block diagram showing a transmitter/receiver system, which may be a P2P or base station/UE system.

FIG. 2 is a block diagram showing aspects of a transmitter system 210 and a receiver system 250 in a Multiple-Input Multiple-Output (MIMO) system 200. Aspects of the transmitter system may be adapted for an access point, for example a base station, which may cooperate with one or more user equipments to configure a peer-to-peer (P2P) connection as described herein. Aspects of the receiver system may be adapted for an access terminal, for example a mobile station or user equipment, in communication with the access terminal. The transmitter system 210 and receiver systems 250 exemplify a suitable transmitter-receiver system in which other, more detailed aspects of the present disclosure may be practiced. It should be apparent that these more detailed aspects may also be practiced using other transmitters, receivers, or transmitter-receiver systems, and is not limited to the particular architecture illustrated in FIG. 2. It should be further apparent that a transmitter system that incorporates inventive aspects of the present disclosure may generally include other components or aspects as described elsewhere herein.

At the transmitter system 210, traffic data for a number of data streams is provided from a data source 212 to a transmit (TX) data processor 214. In some transmitter systems, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams may then be provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals may be received by NR antennas 252a through 252r. The received signal from each antenna 252 may be provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 may then receive and process the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 may process received data and generate appropriate response signals according to a control methodology, using data and instructions in the operatively coupled memory 272. The methodology may include configuring P2P communications, as described in more detail elsewhere herein.

The reverse link message may comprise various types of information regarding the communication link and/or the received data stream. The reverse link message may then be processed by a TX data processor 238, which may also receive traffic data for a number of data streams from a data source 236 to provide uplink signals. The uplink signals may be modulated by a modulator 280, conditioned by transmitters 254a through 254r, and transmitted back to transmitter system 210.

At transmitter system 210, the modulated uplink signals from receiver system 250 may be received by antennas 224, conditioned by receivers 222, demodulated by a demodulator 240, and processed by a RX data processor 242 to extract a reverse link message transmitted by the receiver system 250. Processor 230 may then determine which pre-coding matrix to use for determining the beamforming weights then processes the extracted message, using data and instructions stored in a memory 232 operable associated with the processor 230. The processor 230 may also generate messages for transmitting to the receiver system 250, to a macro base station, or to other femto base stations, and initiate other actions to support configuring of P2P communications, as described in more detail elsewhere herein. Instructions and data for performing these operations may be stored in the memory 232, and loaded into the processor 230 for execution at appropriate times.

Figure 3:
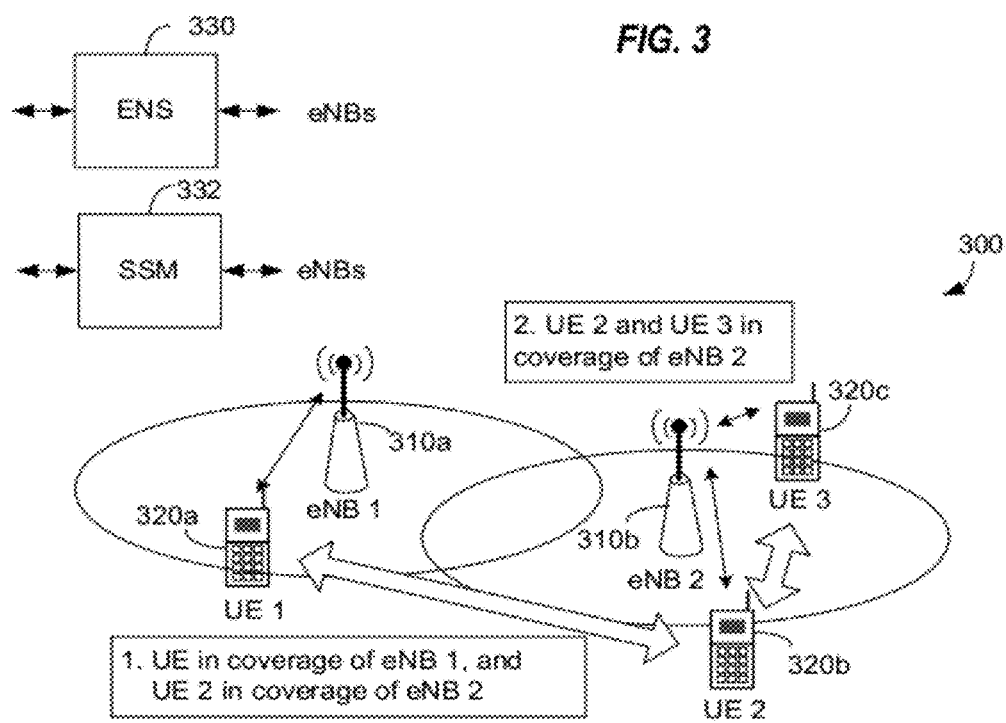
FIG. 3 shows a wireless communication network, which may be an LTE network or some other wireless network, including a P2P capability.

FIG. 3 shows a wireless communication network 300, which may be an LTE network or some other wireless network. Wireless network 300 may also be referred to as, or may be a part of, a wide area network (WAN), a public land mobile network (PLMN), etc. Wireless network 300 may include a number of evolved Node Bs (eNBs) and other network entities. For simplicity, only two eNBs 310a and 310b are shown in FIG. 3. An eNB may be an entity that communicates with the UEs and may also be referred to as a Node B, a base station, an access point, etc. Each eNB 310 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 3, eNBs 310a and 310b may each be a macro eNB for a macro cell, a pico eNB for a pico cell, or a home eNB (HeNB) for a femto cell. An eNB may support one or multiple cells.

UEs may be dispersed throughout wireless network 300, and each UE may be stationary or mobile. For simplicity, only three UEs 320a, 320b and 320c are shown in FIG. 3. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB in a WAN, which may be referred to as WAN communication. A UE may also communicate directly with another UE, which may be referred to as P2P communication or direct communication. A UE communicating directly with another UE may be referred to as a P2P UE. In the example shown in FIG. 3, UEs 320a and 320b may communicate peer-to-peer, and UE 320c may communicate with eNBs 310b. UEs 320a and 320b may also be capable of communicating with eNBs, e.g., when not engaged in P2P communication or possibly concurrent with P2P communication.

The network 300 may further include an Expression Name System (ENS) 330 and/or a Service Specific Manager (SSM) 332 in communication with eNBs such as eNB 310a and 310b. Operations of the ENS 330 and SSM 332 are discussed in more detail later in the specification.

A UE may directly communicate with another UE via an air interface, which may be referred to as a Ud interface. The Ud interface may include (i) a protocol stack for a user plane carrying traffic data and (ii) a protocol stack for a control plane carrying signaling. In one design, the user plane protocol stack for the Ud interface may include Packet Data Convergence Protocol (PDCP), Radio Link Control (RLC), Medium Access Control (MAC), and physical layer (PHY). In one design, the control plane protocol stack for the Ud interface may include Radio Resource Control (RRC), PDCP, RLC, MAC, and PHY. RRC, PDCP, RLC and MAC in LTE are described in documents 3GPP TS 36.331, TS 36.323, TS 36.322, and TS 36.321, respectively, which are publicly available.

Figure 4:
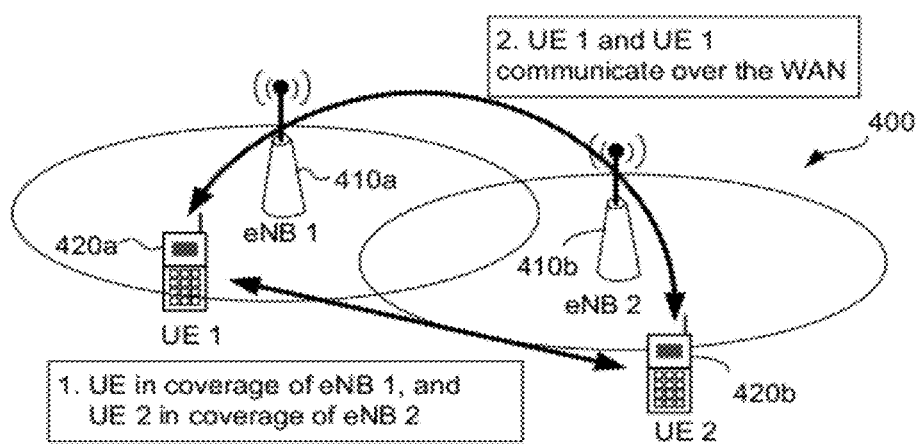
FIG. 4 shows different types of communication between a first UE and second UE in a wireless network as shown in FIG. 3.

FIG. 4 shows different types of communication between a first UE 420A and second UE 420a in FIG. 3. The first UE 420a and second UE 420a may communicate with each other via WAN 400 for WAN communication. In this case, first UE 420a may send data to and receive data from its serving eNB 410a (eNB 1), the second UE 420a may send data to and receive data from its serving eNB 410b (eNB 2), and data for first UE 420a and second UE 420a may be forwarded between eNB 1 and eNB 2. The communication between each UE and its serving eNB may be via an air interface (e.g., LTE) supported by the WAN. For example, first UE 420a and second UE 420a may communicate over the LTE air interface using existing procedures as described in 3GPP TS 36.300 and 3GPP TS 23.401, which are publicly available. Consistent with the foregoing, as used herein, "RRC" refers a protocol for handling control plane signaling between UEs and a radio access network (RAN). Functions of RRC messages may include, for example: connection establishment and release; broadcast of system information; radio bearer establishment, reconfiguration and release; connection mobility; paging notification and release; handling issues related to link quality; and outer loop power control.

The first UE 420a and second UE 420a may also communicate with each other directly for P2P communication. In this case, first UE 420a may send data directly to second UE 420a, and vice versa.

Various communication scenarios may be supported for P2P. In a first communication scenario, a UE may detect a peer UE (e.g., through peer discovery). The UE may then exchange control information via a WAN and thereafter establish direct communication with the peer UE. If it is not possible to establish direct communication, then the two UEs may communicate via the WAN. In a second scenario, two UEs may be in communication via a WAN and may detect each other through peer discovery. These UEs may then establish direct communication. In a third scenario, a UE may detect a peer UE (e.g., through peer discovery) and may establish direct communication without first exchanging any information via a WAN. In this scenario, authorization from a network operator may be skipped.

In one design, seamless session mobility may be supported. In this case, switching between WAN communication and P2P communication may be seamlessly performed (e.g., from the perspective of an application) going from P2P communication to WAN communication, or vice versa.

In one design, a network operator may be able to enable or disable whether a UE can establish a direct connection with another UE. In one design, a UE may be able to establish a direct connection on licensed spectrum to UEs in any PLMN (e.g., subject to roaming agreements between different network operators). In one design, a UE may be able to establish a direct connection on unlicensed spectrum to UEs in any PLMN (e.g., subject to network operator configuration). The use of P2P services may not affect services running in parallel for the same UE.

Figure 5:
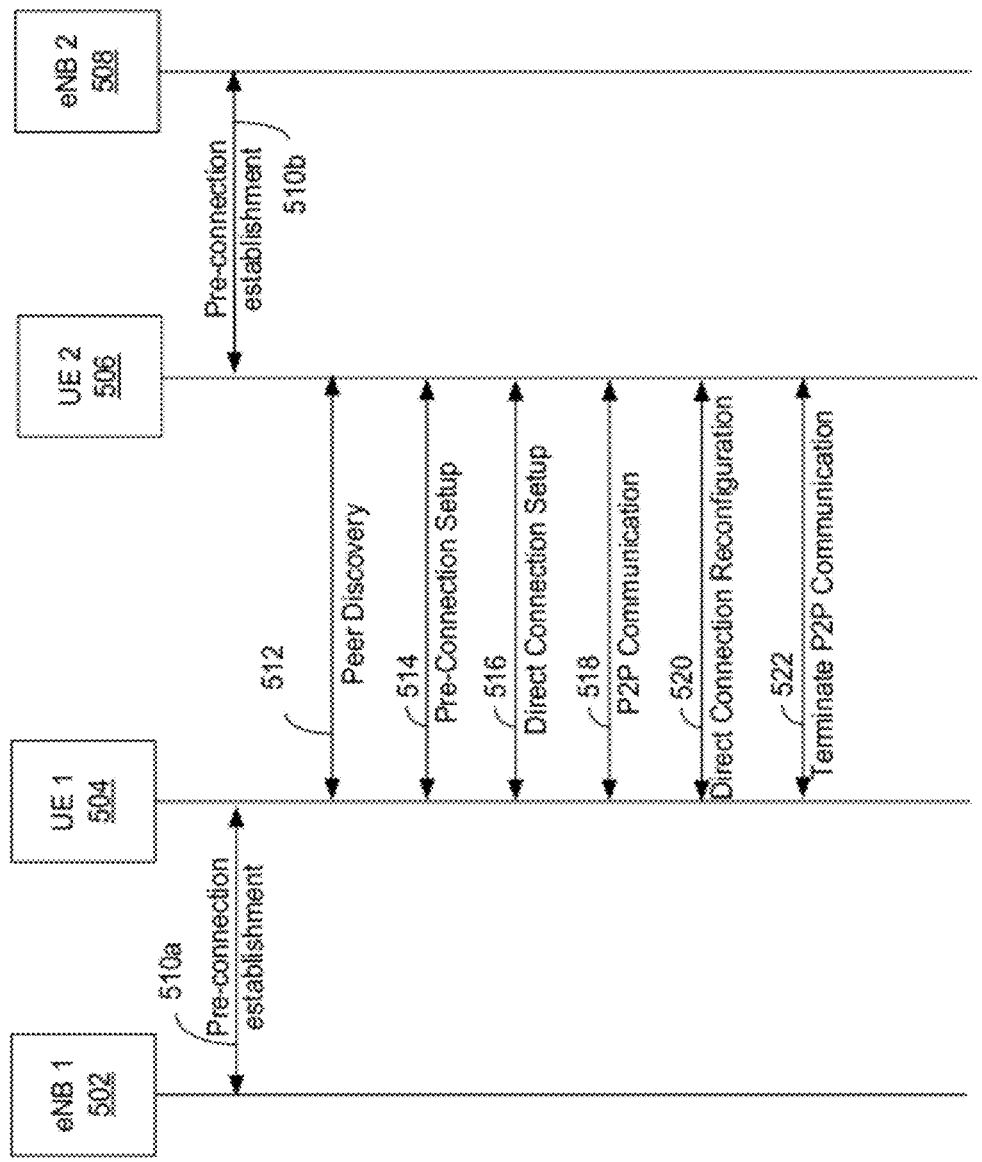
FIG. 5 is a sequence diagram showing aspects of a method for establishing P2P communication.

FIG. 5 shows a flow diagram of a design of a process 500 for establishing P2P communication. A first UE 504 may perform pre-connection establishment 510a with its serving eNB 502 to obtain pertinent information to use for P2P communication 518. Similarly, a second UE 506 may perform pre-connection establishment 510b with its serving eNB 508 to obtain pertinent information to use for P2P communication 518. The first UE 504 and second UE 506 may correspond to UEs 320a and 320b in FIG. 3. Steps 510a and 510b may be performed by first UE 504 and second UE 506, respectively, at any time. For example, first UE 504 may perform pre-connection establishment when it powers on, or when P2P communication is desired.

The first UE 504 and second UE 506 may perform peer discovery to detect for other UEs within their vicinity at 512. Peer discovery 512 may be performed after pre-connection establishment 510a, 510b or prior to pre-connection establishment. Each UE may perform peer discovery 512 by (i) transmitting a proximity detection signal (PDS) to allow other UEs to detect the presence of that UE and/or (ii) detecting proximity detection signals transmitted by other UEs to announce their presence and/or services. A proximity detection signal may also be referred to as a peer detection signal, or other terminology. The first UE 504 and second UE 506 may detect each other via the peer discovery process 512.

The first UE 504 and second UE 506 may perform pre-connection setup 514 procedure to determine pertinent parameters to use for establishing a direct connection between the UEs. The first UE 504 and second UE 506 may then perform direct connection setup 516, based on the parameters obtained in the pre-connection setup procedure 514, to establish a direct connection between the UEs. The first UE 504 and second UE 506 may then communicate directly with each other for P2P communication 518.

During the P2P session, first UE 504 and second UE 506 may perform direct connection reconfiguration 520 to reconfigure the direct connection between the UEs. Reconfiguration may occur at any time (if at all) and may occur any number of times during the P2P session. After each reconfiguration, first UE 504 and second UE 506 may operate in accordance with updated parameters from the reconfiguration. The first UE 504 and/or second UE 506 may terminate the P2P communication 522 at any time. The various steps in FIG. 5 are described in further detail below.

As shown in FIG. 5, UEs may perform peer discovery to facilitate P2P communication. Peer discovery is a procedure whereby a UE detects the presence of other UEs and/or the availability of services advertised by other UEs within radio frequency (RF) proximity. Peer discovery may be performed as described below.

In one design, P2P may be supported by a WAN and may be authorized (e.g., by a network operator) for UEs within the coverage of the WAN. For peer discovery, a UE within the WAN may be authorized before the UE can activate a peer discovery procedure in a licensed spectrum. For direct connection operation, a UE within the WAN may be authorized prior to establishing a direct connection with a peer UE.

In an aspect, pre-connection establishment may be performed to enable a UE to obtain P2P configuration information that may be used for P2P communication. In general, the P2P configuration information may include any information that may be pertinent for P2P. In one design, the P2P configuration information may convey resources allocated for P2P (e.g., for peer discovery and/or P2P communication), UE identities (IDs) to use for P2P, service credentials for P2P, etc. The allocated resources for P2P may include resources for the PHY layer (e.g., time interlaces, resource blocks, etc.), resources for the MAC layer, etc. The UE IDs may include Cell Radio Network Temporary Identifiers (C-RNTIs), etc. The service credentials may include security certificates that authenticate the P2P service(s) provided by the UE. In one design, pre-connection establishment may be performed by a UE when it is connected to a WAN.

FIG. 6 shows a design of a process 600 for pre-connection establishment based on unicast signaling. Process 600 may be used for steps 510a and 510b in FIG. 5. In the example shown in FIG. 6, UE 606 may communicate with its serving eNB 602, and UE 608 may communicate with its serving eNB 604. Each UE may perform pre-connection establishment via its serving eNB, which may be a macro eNB, a femto eNB, or other access point. In one design that is shown in FIG. 6, pre-connection establishment may be performed between a UE and an eNB by exchanging RRC messages, which are control messages for an upper layer protocol. RRC messages in other protocols (e.g., MAC, PHY, etc.) may also be used for pre-connection establishment. In one design, existing protocols (e.g., RRC) in LTE may be augmented with additional functionalities to support P2P.

For pre-connection establishment, a first UE 606 may send an RRC P2P configuration request ("RRCP2PConfigRequest") message 610 to request for P2P configuration information. The eNB 602 may receive the message from the requesting UE 606 and may send an RRC P2P configuration message ("RRCP2PConfiguration") 612 message to the first UE 606 (for example, via an Uu interface) to establish all P2P configurations needed by the first UE 606 prior to actual direct connection establishment, which may be via the Ud interface. The first UE 606 may return a, RRC P2P configuration complete ("RRCP2PConfigComplete") message 614 to the eNB 602 to acknowledge receipt of the P2P configuration information. The RRCP2PConfigRequest message, RRCP2PConfiguration message 610, and RRCP2PConfigComplete message 612 may be new RRC messages defined to support P2P.

Similarly, the second UE 608 may send a RRCP2PConfigRequest message 616 to a second eNB 604 to request P2P configuration information. The second eNB 604 may send a RRCP2PConfiguration message 618 to the second UE 608 to establish all P2P configurations needed by the second UE 608 prior to actual direct connection establishment. The second UE 608 may return a RRCP2PConfigComplete message 620 to the second eNB 604. In FIG. 6, each UE 606, 608 may initiate pre-connection establishment at any time, and steps 610 and 616 may be independent and uncorrelated in time.

FIG. 7 shows a design of a process 700 for pre-connection establishment based on broadcast signaling. Process 700 may also be used for steps 510a and 510b in FIG. 5. In the example shown in FIG. 7, a first eNB 702 may periodically broadcast system information blocks (SIBs) to UEs within its coverage 710. One or more of the SIBs from the first eNB 702 may carry P2P configuration information for UEs within the coverage of first eNB 702. first UE 706 may receive the SIBs from first eNB 702, extract the P2P configuration information from the appropriate SIB(s), and store the extracted P2P configuration information. Similarly, second eNB 704 may periodically broadcast SIBs to UEs within its coverage (step 2). One or more of the SIBs from second eNB 704 may carry P2P configuration information for UEs within the coverage of second eNB 704. A second UE 708 may receive the SIBs from the second eNB 704 and may extract and store the P2P configuration information from the appropriate SIB(s). System information blocks include system information about the current cell or network, and may be used to convey the system information to all UE's attached to a cell. System information blocks may be periodically transmitted to UEs in system information messages in designated subframes of a radio frame.

A UE may have acquired P2P configuration information from its serving eNB via pre-connection establishment, e.g., as shown in FIG. 6 or 7. The UE may also perform peer discovery and may discover a peer UE of interest. The UE may then establish a direct connection with the peer UE for P2P communication.

In one design, for direct connection establishment between two UEs, one UE (e.g., a UE that initiates a direct connection) may be referred to as a client UE, and the other UE may be referred to as a manager UE. The client UE may play the role of a conventional UE in certain Non-Access Stratum (NAS)-like and RRC procedures supporting P2P. The manager UE may play the role of a conventional eNB in certain NAS-like and RRC procedures supporting P2P.

Direct connection may be established in various manners, which may include one or more of the following:
  WAN assisted—a client UE and a manager UE set up a direct connection through a WAN, and
  Direct establishment—a client UE and a manager UE set up a direct connection without going through the WAN.

Direct connection setup assumes that peer discovery has already been performed. The client UE may know a service discovery ID (SD ID) of the manager UE. The manager UE may or may not have discovered the client UE for direct connection setup. In one design, each direct connection may be independently established. For example, a given UE may be a client UE for one direct connection and may be a manager UE for anther direct connection. Before direct connection establishment between two UEs can occur, both UEs may be configured with their P2P configurations via their serving eNBs, e.g., as shown in FIG. 6 or 7.

In another aspect, direct connection establishment may include two phases:
  Pre-connection setup—obtain pertinent information to perform direct connection setup, and
  Direct connection setup—establish pertinent bearers for a direct connection between two UEs.

The bearers for the direct connection between the two UEs may include one or more signaling radio bearers (SRBs), one or more data radio bearers (DRBs), one or more data network bearers, etc. A radio bearer may also be referred to as a logical channel used to send data. A radio bearer may be associated with certain characteristics such as quality-of-service (QoS) attributes. The SRBs and DRBs may be used to exchange signaling and traffic data over the air. The data network bearers may be used to exchange data via network entities and may be referred to as Evolved Packet System (EPS) bearers in LTE.

Pre-connection setup may be performed in different manners for different scenarios, which may include the following:
  Case 1—a client UE requests a manager UE to set up a direct connection, and
  Case 2—a manager UE requests a client UE to set up a direct connection.

For case 1, the manager UE may not be transmitting SIBs. The client UE may initiate direct connection and may request the manager UE to send pertinent information for direct connection setup. For case 2, the manager UE may periodically transmit SIBs and may request the client UE to set up a direct connection.

For case 1, the client UE may be in an RRC idle state, may not have a C-RNTI assigned to it, and may not have SRBs, DRBs, and EPS bearers established. The client UE may acquire SIB information from another UE, and the responding UE may behave like an eNB. Both the signaling and user data may be carried on the Ud interface.

It may be desirable to reuse existing WAN procedures (e.g., LTE procedures) as much as possible for pre-connection setup and direct connection setup. This may reduce complexity to support P2P.

FIG. 8 shows a design of a process 800 for pre-connection setup for case 1. Process 800 may be used for preconnection setup as shown at 514 in FIG. 5. Process 600 may be used when a manager UE 804 is inactive 806 (e.g., not transmitting any SIB) to allow a client UE 802 to establish a direct connection with the manager UE 804. The client UE 802 may know the manager UE 804, e.g., via peer discovery.

The client UE 802 may send a connection alert ("ConnectionAlert") message 808 to the manager UE 804. The ConnectionAlert message 808 may wake up the manager UE 804 and may include various parameters such as a connection ID for the client UE 802 (Connection_ID1), a connection ID for the manager UE 804 (Connection_ID2), a preferred list of P2P device IDs (PDIs) (Preferred_PDI_List), etc. A preferred PDI is a PDI that the client UE prefers due to interference consideration. The preferred list may include preferred PDIs that the client UE 802 would like to use for communication with the manager UE 804. A UE may be associated with a particular PDI and a particular C-RNTI that may be used to identity the UE at different layers for P2P. For example, the PDI may be used to identify the UE for different P2P functions, and the C-RNTI may be used to identify the UE in the MAC and PHY layers.

After sending the ConnectionAlert message 808, the client UE 802 may start a PDI_Req_Timer 810 and may attempt to decode all potential PDIs. The client UE 802 may terminate the pre-connection setup process 800 if no response is received from the manager UE 804 when the timer expires. The manager UE 804 may become active 812 in response to receiving the ConnectionAlert message 808 from the client UE 802. The client UE and the manager UE may perform interference management 814 to reduce interference that may be created by the P2P connection between these two UEs to other P2P connections and/or to WAN connections.

The manager UE 804 may select a physical device identifier (PDI) 816 to assign to the client UE 802, e.g., from the preferred list of PDIs received from the client UE. The selected PDI may be referred to herein as "PDIx." The manager UE 804 may send a connection response ("ConnectionResponse") message 818 to the client UE 802. The ConnectionResponse message 818 may include the Connection_ID1 and Connection_ID2 included in the ConnectionAlert message 808 from the client UE 802, the PCIx selected 816 by the manager UE 804, and/or other information. The manager UE 804 may start transmitting 820 the PDIx, a master information block referred to as MIBx, a SIB referred to as SIBx, and other information. SIBx and MIBx may correspond to PDIx, e.g., similar to a regular LTE WAN where MIB and SIB correspond to a physical cell identity (PCI).

In FIG. 8, operations 808, 814, 818 and 820 may be performed via messages exchanged directly between the client UE 802 and the manager UE 804 (e.g., via the Ud interface). Alternatively, steps 808, 814, 818 and 820 may be performed via messages exchanged between the two UEs through a WAN (e.g., using WAN Internet Protocol (IP) transport) if the WAN is present.

The client UE 802 may not accept the PDIx selected by the manager UE 804 at 816 and sent to the client UE at 820. In this case, steps 808 to 820 may be repeated until the PDI selected by the manager UE is accepted by the client UE, or the PDI_Req_Timer expires, or a PDI Reject is received (not shown in FIG. 6), or some other termination condition is encountered.

FIG. 9 shows a design of a process 900 for pre-connection setup for a scenario in which a manager UE 904 requests a client UE 902 to set up a direct connection, which may be referred to as case 2. Process 900 may also be used for pre-connection setup shown at 514 in FIG. 5.

The manager UE 904 may periodically transmit PDIx, MIBx and SIBx 906. The manager UE 904 may send a ConnectionAlert message 908 to the client UE 902. The ConnectionAlert message 908 may include a Connection_ID1, a Connection_ID2, and a Preferred_PDI_List. The client UE 902 may not be aware of SIBx from the manager UE 904 prior to receiving the ConnectionAlert message 908 and may then receive SIBx. The client UE 902 may select a PDI from the preferred list of PDIs received from the manager UE 904. The selected PDI may be referred to herein as PDIx. The client UE 902 may then send a ConnectionResponse message 910 in response to the connection alert 908, which may include Connection_ID1, Connection _ID2, and PDIx, to the manager UE 904. The client UE 902 may then start a random access procedure (not shown in FIG. 9).

In FIG. 9, the operations 906, 908 and 910 may be performed directly between the client UE 902 and the manager UE 904 (e.g., via the Ud interface). Alternatively, operations 906, 908 and 910 may be performed via a WAN (e.g., using WAN IP transport) if the WAN is present.

FIGS. 8 and 9 show two designs of performing pre-connection setup to obtain pertinent information (e.g., from SIB) for direct connection setup. Pre-connection setup may also be performed in other manners. In any case, after acquiring the pertinent information, a client UE may establish signaling and data radio bearers for direct connection with a manager UE.

FIG. 10 shows a design of a process 1000 for direct connection setup. Process 1000 may be used for direct connection setup as shown at 516 in FIG. 5. A client UE 1002 may transmit a Random Access Preamble 1006 to a manager UE 1004. The manager UE 1004 may return a Random Access Response (RAR) 1008 to the client UE 1002. The RAR 1008 may include timing alignment information to adjust the uplink timing of the client UE 1002, an initial uplink grant for the client UE, an assignment of a temporary C-RNTI to the client UE, and other information. The client UE 1002 may then send a third Message 1010 to the manager UE 1004. The third message 1010 may include an RRC connection request ("RRCConnectionRequest") message, which may include a full UE ID that uniquely identifies the client UE 1002 for a P2P session. The manager UE 1004 may send a fourth Message 1012 to the client UE 1002. The fourth message 1010 may include (i) an RRC connection setup ("RRCConnectionSetup") message to establish a first SRB (SRB1) and (ii) a temporary UE-ID in a MAC control element (CE). This temporary UE ID, which may be a 48-bit C-RNTI, may be associated with the Random Access Preamble sent by the UE at 1006 and may be used to identity the UE prior to assignment of the full UE ID. Steps 1006 to 1012 may be part of a random access procedure that may be used for initial access in LTE. The client UE may send an RRC connection setup complete ("RRCConnectionSetupComplete") message to the manager UE 1004.

The client UE 1002 and the manager UE 1004 may perform mutual authentication 1016. The UEs may exchange various messages ay 1016 to enable the client UE 1002 to authenticate the manager UE 1006, and vice versa. A decision as to which UE will send a security mode command ("SecurityModeCommand") message 1018 may also be made during mutual authentication 1016.

The manager UE 1004 may send a SecurityModeCommand message 1018 to the client UE 1002. This message may include an indication of a particular ciphering algorithm to use, a particular integrity algorithm to use, and similar security mode information. A cryptographic key may be generated between the client UE 1002 and the manager UE 1004, which may be used for ciphering and integrity protection of RRC messages during the P2P session. This cryptographic key may be a cryptographic key $K_{eNB}$ generated in regular LTE system during call setup.

The manager UE 1004 may send an RRC connection reconfiguration ("RRCConnectionReconfiguration") message 1020 carrying a Default EPS bearer request to the client UE 1002. A second SRB (SRB2), a DRB, and an EPS bearer may be established upon reception of the RRCConnectionReconfiguration message by the client UE. The client UE 1002 may send a message indicating that the security mode procedure is completed ("SecurityModeComplete") message 1022 to the manager UE 1004 to acknowledge the Security- ModeCommand message received at 1018. The client UE 1002 may also send a message indicating that the RCC connection reconfiguration is completed ("RRCConnectionReconfigurationComplete") message 1024 to the manager UE 1004 to acknowledge the RRCConnectionReconfiguration message received at 1020. The client UE 1002 may send an uplink information transfer ("ULInformationTransfer") message 1026 to the manager UE 1004. A direct connection between the client UE 1002 and the manager UE 1004 may be established after ULInformationTransfer message 1026. The client UE 1002 and the manager UE 1008 may thereafter exchange user data via the direct connection 1030.

The various RRC messages in FIG. 10 are described in 3GPP 36.331, entitled "Evolved Universal Terrestrial Radio Access (E-UTRA) Radio Resource Control (RRC); Protocol specification". The random access procedure and the messages for the random access procedure are described in 3GPP 36.300, entitled "Evolved Universal Terrestrial Radio Access (E-UTRA) and Evolved Universal Terrestrial Radio Access Network (E-UTRAN); Overall description; Stage 2". These documents are publicly available.

In FIG. 10, the operations 1006 and 1008 may be performed as part of a normal random access procedure. In some embodiments, steps 1006 and 1008 may also be skipped, e.g., if there is no need to adjust the uplink timing of the client UE due to a relatively short distance between the client UE and the manager UE, or if a PHY Interlace Client is already included.

In another aspect, a direct connection between two UEs may be reconfigured at any time during a P2P session, as shown in FIG. 5. In general, reconfiguration may be performed to change any aspect of P2P operation for the two UEs. For example, reconfiguration may be performed to change one or more of the following:
  PHY layer parameters,
  MAC layer parameters,
  Tear down existing radio bearers or establish new bearers,
  Change downlink transmission mode for a UE,
  Enable or disable operation on multiple carriers, and
  Configure measurements by a UE.
Reconfiguration may be performed in various manners, as described below.

In yet another aspect, symmetric signaling (or a combination of asymmetric signaling and symmetric signaling) may be used for configuration or reconfiguration of a direct connection between two UEs. Conventionally, asymmetric signaling is used for NAS and RRC procedures for a WAN connection between an eNB and a UE. For asymmetric signaling, the eNB initiates reconfiguration and sends a connection reconfiguration message to the UE to reconfigure the WAN connection between the eNB and the UE. The UE then returns a connection reconfiguration complete message to the eNB. For symmetric signaling to reconfigure a direct connection, either of the two UEs may send a connection reconfiguration message to the other UE, and the other UE may return a connection reconfiguration complete message. Symmetric signaling may enable the UEs to reconfigure one another and may be more applicable to P2P than WAN. In one design, for P2P communication, all or certain NAS and RRC procedures for P2P may be symmetrical and may be initiated by either the client UE or the manager UE.

Figure 11:
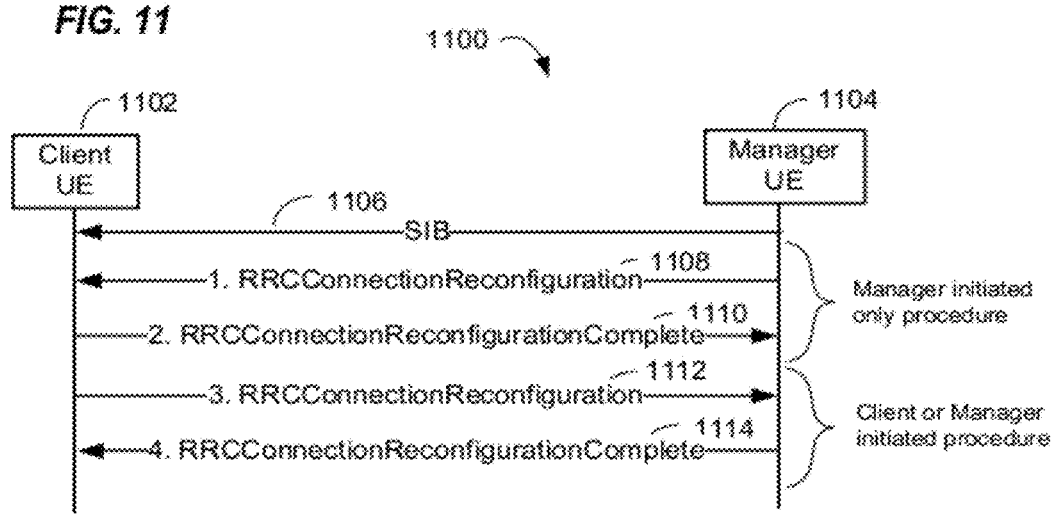
FIG. 11 is a sequence diagram showing aspects of a method for direct connection reconfiguration.

FIG. 11 shows a design of a process 1100 for direct connection reconfiguration. Process 1100 may be used for direct connection reconfiguration as shown at 520 in FIG. 5. Process 1100 may be used to modify an RRC connection, e.g., to establish, modify, or release radio bearers, to setup, modify, or release measurements, and/or to perform other functions. In one design, a manager UE 1104 sends SIB may be able to initiate reconfiguration. In another design, any UE can initiate reconfiguration.

A manager UE 1104 may send SIB 1106 to a client UE 1102. The manager UE may also send an RRC connection reconfiguration ("RRCConnectionReconfiguration") message 1108 to the client UE 1102, e.g., to configure measurements performed at the client UE 1102. The RRCConnectionReconfiguration message 1108 may include the types of measurements to make for RRC connection reconfiguration, the entities from which to make measurements, events triggering measurements, events triggering reporting of the measurements, and similar information. The client UE 1102 may return a RRCConnectionReconfigurationComplete message 1110 to the manager UE 1104 for acknowledgement. The client UE 1102 may send a RRCConnectionReconfiguration message 1112 to the manager UE 1104, e.g., to configure measurements performed at the manager UE. The manager UE 1104 may send an RRC connection reconfiguration ("RRCConnectionReconfigurationComplete") message 1114 for acknowledgement in response to the RRCConnectionReconfiguration message 111.

The example in FIG. 11 shows two transactions for reconfiguration, with each transaction being performed by a pair of RRCConnectionReconfiguration and RRCConnectionReconfigurationComplete messages. In general, any number of messages may be sent by the two UEs for any number of transactions for reconfiguration, and each transaction may be initiated by any UE.

In general, asymmetric signaling and/or symmetric signaling may be used for reconfiguration. Certain reconfiguration transactions may be more suitable for initiation by the manager UE. Other reconfiguration transactions (e.g., for measurements) may be suitable for initiation by either the manager UE or the client UE.

In one design, session continuity may be maintained for P2P communication. In one scenario, a pair of UEs may engage in P2P communication, may move out of range of each other, and may handover to a WAN. In another scenario, a pair of UEs may initially communicate over a WAN, may move within range of each other, and may establish a direct connection. In both scenarios, continuity of communication between the two UEs may be maintained even with handover from P2P communication to WAN communication, or vice versa.

A UE may perform peer discovery to detect the presence and/or services of other UEs within RF proximity. Peer discovery may or may not include the case of a UE registering a location at a server hosted in a network or querying the server for the presence of any registered UEs nearby. This function may run over the top of any existing WAN/LAN (local area network) infrastructure without any additional support. However, the server may be used to improve the efficiency of peer discovery, e.g., where a UE performs peer discovery based on the expected presence of peer(s) in the vicinity, as reported by the server.

Peer discovery may or may not provide a means for a UE to discover local services connected to the WAN/LAN, e.g., similar to the manner of service discovery protocols such as Bonjour or UPnP. However, the use of these protocols on the WAN/LAN may lead to the UE activating peer discovery based on the expected presence of peer(s) in the vicinity, e.g., a peer connected to the same HeNB using Local Internet Protocol Access (LIPA).

In one design, one or more of the following may be supported:

Autonomous peer discovery—a UE performs peer discovery autonomously, without interaction with a user, and Manual peer discovery—a UE performs peer discovery when instructed, e.g., by a user.

Additional, different and/or fewer peer discovery schemes may also be supported.

In general, a UE may perform peer discovery in various manners. In one design, the UE may detect a peer camped on the same cell or a different cell. In another design, the UE may detect a peer advertising on the same frequency or a different frequency. In yet another design, the UE may detect a peer advertising on the same PLMN or a different PLMN as the PLMN on which the UE is currently registered (e.g., subject to roaming agreements). In yet another design, the UE may advertise its presence and/or service in a home PLMN or a visited PLMN (e.g., subject to roaming agreements).

In one design, a network or an application may assist a UE with peer discovery, e.g., in order to improve battery life of the UE and overall capacity of the proximity detection signal. For example, the network or the application may inform the UE whether any potential peers and/or a list of specific peers are in the area in order to enable the UE to more efficiently activate or deactivate an appropriate peer discovery mode.

In one design, the following procedures may be supported for peer discovery:

Peer advertisement—a UE advertises its availability for P2P service by transmitting a peer discovery code (PDC) on a proximity detection signal (PDS), and Peer detection—a UE detects a peer by receiving a peer discovery code on a proximity detection signal from the peer.

Additional, different and/or fewer peer discovery procedures may also be supported.

In general, a UE may perform one or both of the procedures listed above. For example, the UE may detect for peers without having to advertise its presence. The UE may also advertise its presence without detecting for peers. Referring back to FIG. 3, UE 320b may perform peer discovery to detect UE 320c camped on a cell in the same eNB 310b. UE 320b may also perform peer discovery to detect UE 320a camped on a cell in a different eNB 310a.

In one design, a PDC may comprise an identifier used in a peer discovery procedure for advertising and detecting a peer and/or a P2P service. A UE may support one or more P2P services and may one or more PDCs, e.g., one PDC for each P2P service supported by the UE. In one design, the UE may advertise one or more PDCs in a single PDS instance or in separate PDS instances.

In one design, a PDC may be uniquely associated with a peer discovery expression (PDE), which may identify a P2P service advertised in the PDC. In one design, the PDE may be provided in a user readable format, e.g., in a free text format using UTF-8 coding. For example, a PDC and an associated PDE may be defined to include one or more of the following fields: a service (e.g., printer), an application (e.g., Skype), a location (e.g., third floor of building X), a protocol (e.g., Digital Audio Access Protocol (DAAP)), a user, a device, etc.

In one design, one or more of the following types of PDCs may be supported:

Managed PDC—a PDC assigned to a P2P service by a network operator or a third party and guaranteed to be unique within its defined domain, and Unmanaged PDC—a PDC not guaranteed to be globally unique.

Additional, different and/or fewer types of PDCs may also be supported.

For a managed PDC, a UE may query an Expression Name System (ENS) to determine a PDE associated with a particular PDC, and vice versa. The ENS may be ENS 330 in FIG. 3 and may be hosted by a network operator or a third party. The ENS may limit the time period for which a managed PDC is valid, e.g., in the case where the UE caches the PDC to PDE mapping. A PDC/PDE pair may be registered at the ENS (e.g., via a WAN/LAN) in order for the PDC/PDE pair to be queried by other UEs.

For an unmanaged PDC, a PDE associated with this PDC may be available only to a UE subscribed to a P2P service associated with the PDC. The PDC/PDE space for a specific P2P service may be controlled by a Service Specific Manager (SSM), which may be SSM 332 in FIG. 3. For example, the SSM may provide information for a PDC/PDE pair for a particular P2P service to only UEs subscribed to the P2P service. This information may comprise the unmanaged PDC and the corresponding PDE, or an appropriate key to identify the unmanaged PDC and determine the corresponding PDE.

In one design, an advertised code (e.g., for an unmanaged PDC) in a PDS may vary over time in order to randomize collisions with other PDCs and reduce the probability of false detection of a peer.

In one design, one or more of the following autonomous peer discovery modes may be supported:

Advertisement mode—a UE advertises one or more PDCs for one or more P2P services supported by the UE, and an interested peer may detect the UE through the advertisement, and Query/Response mode—a UE may advertise a PDC requesting a specific P2P service or a specific peer.

Additional, different and/or fewer autonomous peer discovery modes may also be supported.

For the query/response mode, a UE may advertise a request looking for any peers in the vicinity and subscribed to a particular P2P service. A peer that supports the P2P service may respond by advertising its corresponding PDC.

A number of autonomous peer discovery modes may be supported, and a particular autonomous peer discovery mode may be selected for use in various manners. For example, an autonomous peer discovery mode may be selected based on application configuration or as a function of which peer discovery mode is likely to be more efficient to discover peers based on a current estimate of location, mobility, etc.

For manual peer discovery, a user may request a UE to perform a scan for available peers in the vicinity. The user may limit the request to peers associated with a particular peer discovery code (PDC) or set of PDCs. A PDC may be an identifier used in a peer discovery procedure for advertising and detecting a P2P service, as described below. The UE may receive the request from the user, perform peer discovery, and report all available peers within the scope of the request for which a PDE is known.

Figure 12:
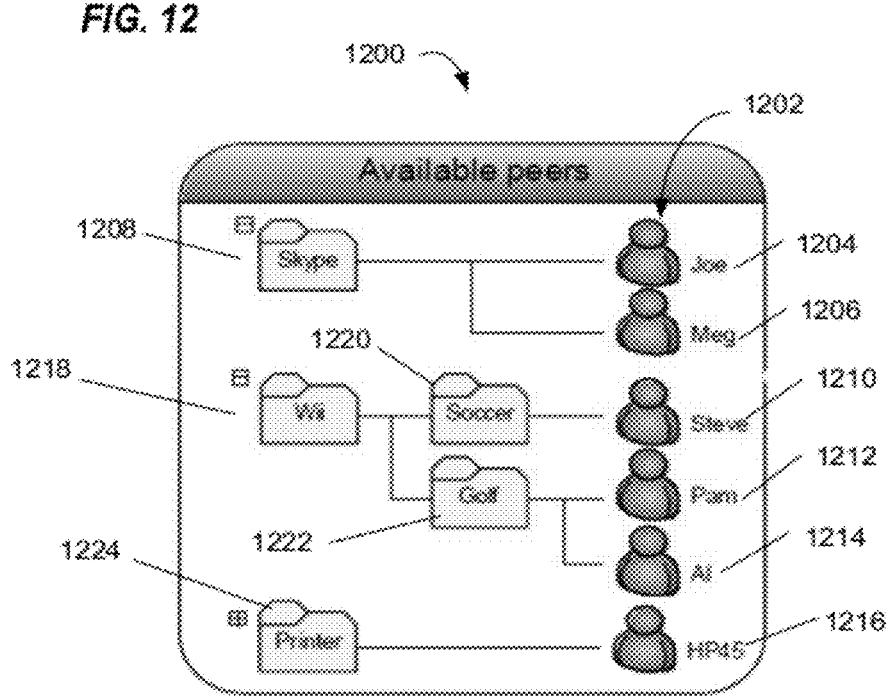
FIG. 12 shows an example of a design for a display of available peers.

FIG. 12 shows a design of a display 1200 of available peers 1202 represented by their associated PDEs. Display 1200 may be used to provide results of a manual peer discovery request or an autonomous peer discovery search. In the example shown in FIG. 12, two peers "Joe" 1204 and "Meg" 1206 may have PDEs associated with a Skype application 1208. One peer "Steve" 1210 may have a PDE associated with a soccer game 1220 for a Wii application 1218, and two peers "Pam" 1212 and "Al" 1214 may have PDEs associated with a golf game 1222 for the Wii application 1218. One peer "HP45" 1216 may have a PDE associated with a printer service 1224.

In one design, a top level hierarchical structure may be used for a PDC (and also a PDE) and may include two components:

Service ID—a service ID of a PDC is a non device-specific component of the PDC that identifies a service being offered by a UE, and Device ID—a device ID of a PDC identifies a particular instance of a service ID, for example, a user, device, location, etc.

Additional, different and/or fewer types of IDs may also be supported.

In one design, a service ID may include one or more fields to identify an application, a protocol, and/or other parameters associated with a service. In one design, a device ID may be unique within a service ID, and different services on a UE may advertise using different device IDs.

In one design, an application advertising a particular service may impose a further hierarchical constraint on the PDC and PDE in order to simplify peer discovery, e.g., similar to the manner in which domain name administration is defined in Domain Name System (DNS). For example, Skype may advertise specific services where a service ID may be structured as "video.skype.p2p", where Skype maintains the second level name structure for all of the individual services advertised, and all Skype applications share a common prefix to the service ID.

For a managed PDC, a UE may query an ENS using a service ID with a wildcard device ID to identify a service associated with the PDC. The UE may also query the ENS with a full PDC to identify the service and device associated with the PDC. The UE may also query the ENS using a partial service ID, and the ENS may return a longest prefix match for the service ID. The UE may or may not be able to query a device ID without a corresponding service ID.

For an unmanaged PDC, a service ID and a device ID may be assigned by an application or a service. A key used to identify other peers may be communicated to a UE, e.g., when the application is downloaded, or the UE subscribes to the service.

In one design, in addition to the service ID and device ID hierarchy, one or more of the following types of device ID may be supported:

Unrestricted device ID—when an unrestricted device ID is used, any UE can identify a particular device associated with an advertised PDC, and Restricted device ID—only a UE with an appropriate key (e.g., exchanged out of band) may be able to identify a particular device associated with the device ID.

Additional, different and/or fewer device ID types may also be supported.

Unrestricted device IDs and/or restricted device IDs may be used for managed PDCs. Unrestricted device IDs and/or restricted device IDs may also be used for unmanaged PDCs. A user may configure a P2P service to advertise a restricted device ID or an unrestricted device ID.

For an unrestricted device ID, a UE can query either an ENS for a managed PDC or an SSM for an unmanaged PDC. The UE may query based on both a service ID and a device ID for a managed PDC. The UE may query based on a service ID and/or a device ID for an unmanaged PDC. The UE may also have a local cached table of pairs of service ID and device ID corresponding to previously detected PDCs.

For a service that uses an unmanaged PDC, an SSM may be used to manage the associated PDC space. This may differ from a managed PDC in several ways. First, there may be no centralized entity to ensure that the unmanaged PDC is globally unique. Second, only an application that recognizes a service ID associated with the unmanaged PDC may be able to query an appropriate SSM to find a device ID associated with the unmanaged PDC.

For a restricted device ID for a managed PDC, a UE may query an ENS using a service ID with a wildcard device ID to identify a service associated with the managed PDC. However, the UE may not be able to query with a full PDC to identify a service ID and a device ID. The restricted device ID may not be unique. The same principles that apply to reducing the probability of false detection for an unmanaged PDC may apply to a restricted device ID, i.e., varying an advertisement over time.

FIG. 13 lists some example use cases for managed and unmanaged PDCs and restricted and unrestricted device IDs in a table 1300.

Various aspects of P2P may be designed such that the use of P2P does not compromise the security of a WAN. In one design, security at the link layer for P2P connections may be comparable to those in a WAN.

In one design, a UE may include a list of allowed PDCs, which may be authorized by a network operator for advertising in peer discovery. The UE may not advertise a managed PDC that is not in the list. It may be possible to authenticate a peer UE advertising a managed PDC as the owner of the managed PDC when establishing P2P communication or WAN communication. The UE may receive a general authorization to advertise any unmanaged PDC or may be prohibited from advertising unmanaged PDCs. Unmanaged PDCs may be authorized or prohibited either in general or in finer-grained control.

A UE may subscribe to a service that uses an unmanaged PDC. The UE may then be able to produce the correct sequence of advertised values for that unmanaged PDC. UEs that do not subscribe to the service may be unable to produce the sequence of advertised values and may also be unable to determine a PDE associated with the unmanaged PDC.

FIG. 14 shows aspects of a method 1400 for configuring UEs for P2P communication. The method 1400 may be performed by a first UE for direct communication with a second UE. The method 1400 may include, at 1402, the first UE receiving P2P configuration information from a base station/eNB. The P2P configuration information may support P2P communication for UEs within the coverage of the base station. For example, the P2P configuration information may specify parameters for configuring a P2P connection between the first UE and a second UE. The second UE may be inside the coverage area of the base station, or outside the coverage area of the base station but within radio range of the first UE. The base station may be a macro base station for a macro cell, or a home base station for a femto cell, or a base station of some other type. The first UE may perform peer discovery to detect the second UE either (i) after receiving the P2P configuration information (e.g., as shown in FIG. 3) or (ii) prior to receiving the P2P configuration information.

The method 1400 may further include, at 1404, first UE may communicating directly with the second UE based on the P2P configuration information. For example, this may include the first UE setting a P2P communication link with the second UE that complies with parameters specified by the P2P configuration information. Examples of such parameters are discussed herein above, for example in connection with FIG. 6, and may include, for example, resources allocated for P2P (e.g., for peer discovery and/or P2P communication), UE identities (IDs) to use for P2P, service credentials for P2P, and other information for establishing a P2P link so as to reduce the risk of interference with, or interference from, wireless communications involving base stations within radio range of the first or second UEs. The allocated resources for P2P may include resources for the PHY layer (e.g., time interlaces, resource blocks, etc.), resources for the MAC layer, or similar resource information. The UE IDs may include Cell Radio Network Temporary Identifiers (C-RNTIs) or similar identifiers. Other aspects of P2P the communication may be as summarized in connection with FIGS. 15-18 below and described in more detail herein above.

FIGS. 15-18 illustrate additional operations or aspects that may be performed in association with, or as part of, the method 1400. One or more of the additional operations 1500, 1600, 1700, and 1800 may optionally be performed as part of method 1400, or describe an aspect modifying one of the elements of the method 1400. The elements 1500, 1600, 1700, and 1800 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1400 includes at least one of the operations 1500, 1600, 1700, and 1800, then the method 1400 may terminate after the at least one operation, without necessarily having to include any subsequent downstream operation(s) that may be illustrated. In an aspect of the additional operations, the P2P configuration information received at 1402 is received by the first UE in at least one of (i) an RRC message, or (ii) at least one SIB, as more particularly described below in connection with FIGS. 15 and 16.

Figure 15:
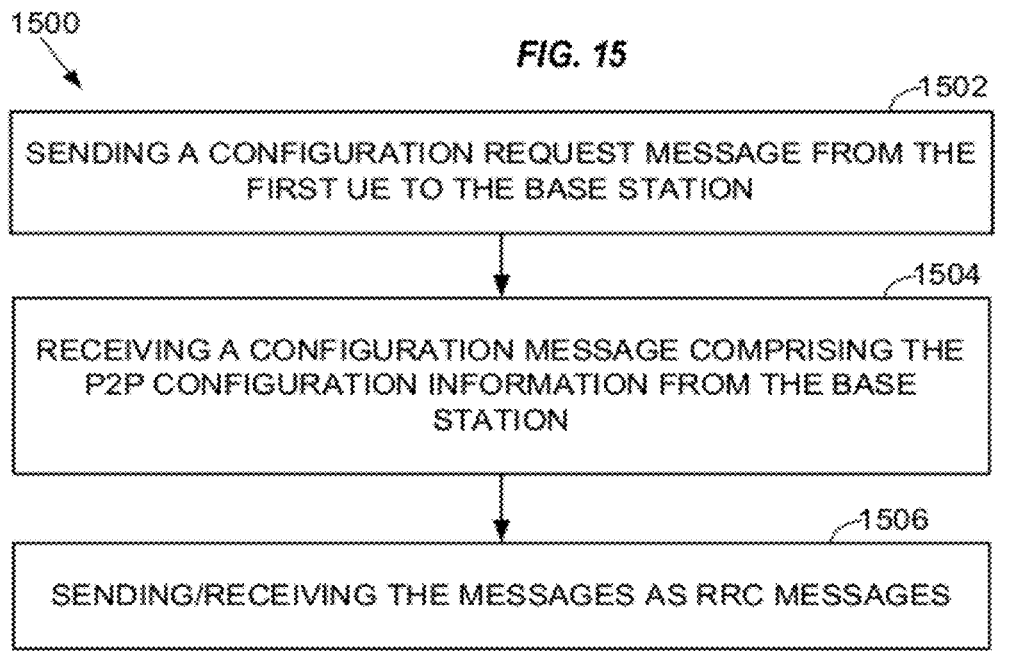

Additional operations 1500 relating to a mode for obtaining the P2P configuration information are shown in FIG. 15. In an embodiment of the method 1400, the operation 1402 may further include, at 1502, the first UE sending a configuration request message to the base station, for example as shown at 610 in FIG. 6. The operation 1402 may further include, at 1504, first UE then receiving a configuration message comprising the P2P configuration information from the base station, for example as shown at 612 in FIG. 6. In an aspect of the method 1400, the configuration request message and the configuration message may comprise RRC messages supporting P2P, as illustrated at block 1506.

Figure 16:
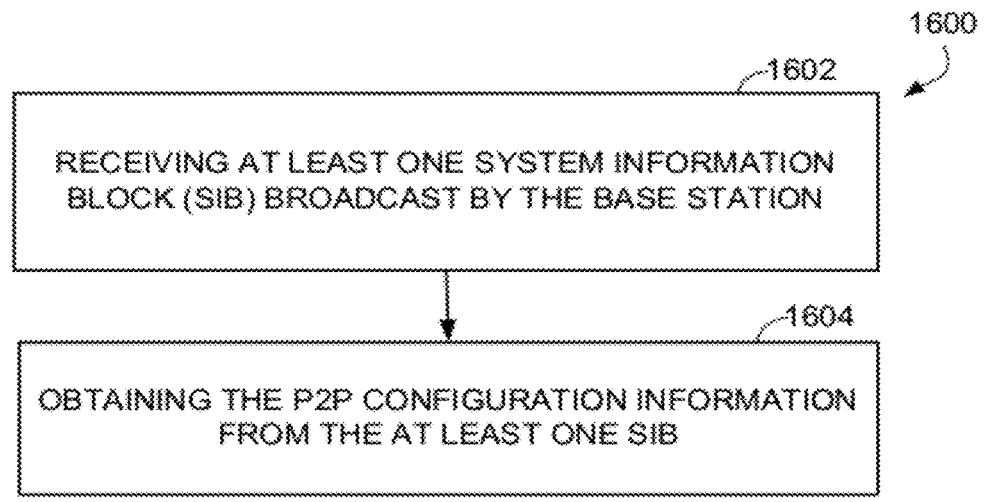

Additional operations 1600 relating to a mode for obtaining the P2P configuration information are shown in FIG. 16, for an alternative design. In another embodiment of the method 1400, the operation 1402 may further include, at 1602, the first UE receiving at least one SIB that is broadcast by the base station, for example as shown at 710 in FIG. 7. The method 1400 may further include, at 1604, the first UE obtaining the P2P configuration information from the at least one SIB. The first UE may also receive the P2P configuration information in other manners or modes.

Figure 17:
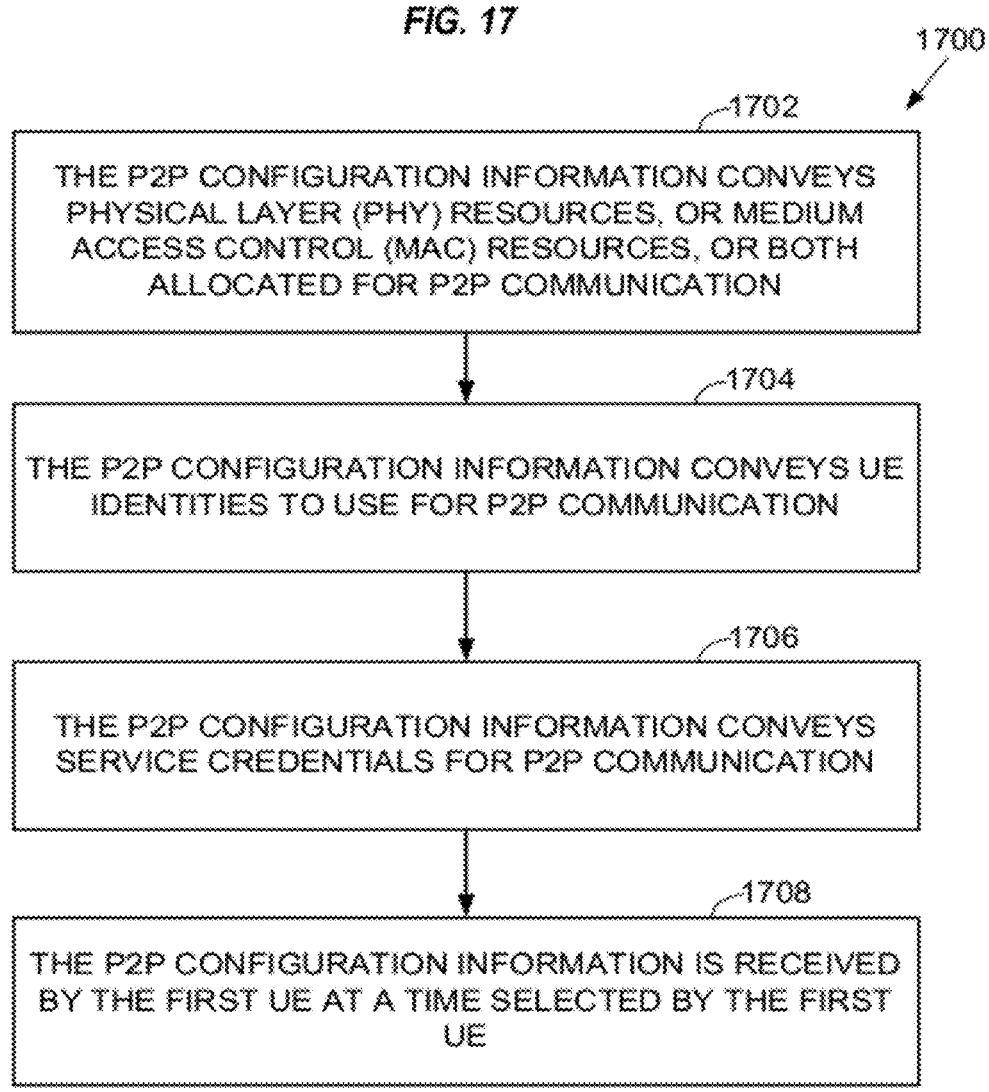

Additional aspects 1700 of the method 1400 are shown in FIG. 17. In one design illustrated at 1702, the P2P configuration information may convey PHY resources, or MAC resources, or both, allocated for P2P communication. In another design illustrated at 1704, the P2P configuration information may convey UE identities to use for P2P communication. In yet another design illustrated at 1706, the P2P configuration information may convey service credentials for P2P communication. The P2P configuration information may also convey other parameters. In another aspect, the method 1400 may include, at 1708, the first UE receiving the P2P configuration information at any time selected (e.g., requested) by the first UE. For example, the UE may trigger provision of the P2P configuration information by transmitting a request.

The method 1400 may further include any one or both of the operations 1800 shown in FIG. 18. The method 1400 may further include, at 1802, performing peer discovery by the first UE to detect the second UE after receiving the P2P configuration information. In the alternative, or in addition, the method 1400 may include, at 1804, performing peer discovery by the first UE to detect the second UE prior to receiving the P2P configuration information.

With reference to FIG. 19, there is provided an exemplary apparatus 1900 that may be configured as a UE in a wireless network, or as a processor or similar device for use within the UE, for configuring a P2P link of a wireless communications system. The apparatus 1900 may include functional blocks that can represent functions implemented by a processor, software, or combination thereof (e.g., firmware).

As illustrated, in one embodiment, the apparatus 1900 may include an electrical component or module 1902 for receiving P2P configuration information from a base station at a first UE, wherein the P2P configuration information supports P2P communication for UEs within a coverage area of the base station. For example, the electrical component 1902 may include at least one control processor coupled to a network interface or the like and to a memory with instructions for communicating with a base station to obtain the configuration data in a predetermined manner. The electrical component 1902 may be, or may include, a means for receiving P2P configuration information from a base station at a first UE, wherein the P2P configuration information supports P2P communication for UEs within a coverage area of the base station. Said means may be or may include the at least one control processor operating an algorithm. The algorithm may include receiving data by wireless transmission, recognizing the data as P2P configuration data based on a signal from the base station, or based on a predetermined template, and storing the configuration information.

The apparatus 1900 may include an electrical component 1904 for communicating directly with a second UE by the first UE based on the P2P configuration information. For example, the apparatus may include a transceiver coupled to a processor operating a communication link as part of a transmitter/receiver pair. The electrical component 1904 may be, or may include, a means for communicating directly with a second UE by the first UE based on the P2P configuration information. Said means may be or may include the at least one control processor operating an algorithm. The algorithm may include applying an identity of the second UE, PHY resource, MAC resource, or service credential from the configuration information to set up a P2P link according to a client/manager protocol as described herein.

The apparatus 1900 may include similar electrical components for performing any or all of the method 1400 described in connection with FIGS. 15-18, which for illustrative simplicity are not shown in FIG. 19.

In related aspects, the apparatus 1900 may optionally include a processor component 1910 having at least one processor, in the case of the apparatus 1900 configured as a mobile entity. The processor 1910, in such case, may be in operative communication with the components 1902-1904 or similar components via a bus 1912 or similar communication coupling. The processor 1910 may effect initiation and scheduling of the processes or functions performed by electrical components 1902-1904.

In further related aspects, the apparatus 1900 may include a network interface component 1914 for communicating with other network entities. The apparatus 1900 may optionally include a component for storing information, such as, for example, a memory device/component 1916. The computer readable medium or the memory component 1916 may be operatively coupled to the other components of the apparatus 1900 via the bus 1912 or the like. The memory component 1916 may be adapted to store computer readable instructions and data for performing the activity of the components 1902-1904, and subcomponents thereof, or the processor 1910, the method 1400, or the methods disclosed herein. The memory component 1916 may retain instructions for executing functions associated with the components 1902-1904. While shown as being external to the memory 1916, it is to be understood that the components 1902-1904 can exist within the memory 1916.

For further example of an apparatus, referring again to FIGS. 2 and 3, the transmitter 210 and receiver 250 provide examples of UEs 320a and 320b in FIG. 3 in a P2P system. At UE 320a, a transmit processor 214 may receive data from a data source 212 and control information from a controller/processor 230. The control information may comprise (i) messages used for direct connection establishment, e.g., as shown in FIGS. 5 to 11, (ii) system information such as MIB and SIBs, and/or (iii) other information and signaling. At UE 320b, data from a data source 236, control information (e.g., for messages used for direct connection establishment) from controller/processor 270, and reference symbols may be processed by a transmit processor 238.

For P2P communication, UEs 320a and 320b may generate various messages used for direct connection establishment, reconfiguration, etc. Each UE may generate P2P signals and proximity detection signals for P2P. Each UE may transmit its signals to the other UE. Each UE may also receive a downlink signal from a base station/eNB and may transmit an uplink signal to the base station/eNB for WAN communication.

Controllers/processors 230 and 270 may direct the operation at UEs 320a and 320b, respectively. Controllers/processors 230 and 270 and/or other processors and modules at each UE may perform or direct process 1400 in FIG. 14 and/or other processes for the techniques described herein. Memories 232 and 272 may store data and program codes for UEs 320a and 320b, respectively.

In one configuration, apparatus 320a and/or 320b for wireless communication may each include means for receiving P2P configuration information from a base station at a first UE, the P2P configuration information supporting P2P communication for UEs within coverage of the base station, and means for communicating directly with a second UE by the first UE based on the P2P configuration information.

In an aspect, the aforementioned means may include processor(s) 214, 220 and/or 230 at UE 320a and/or processors(s) 260, 270 and/or 238 at UE 320b, which may be configured to perform the functions recited by the aforementioned means. In another aspect, the aforementioned means may be one or more modules or any apparatus configured to perform the functions recited by the aforementioned means. Said means may include any one or combination of the aforementioned processors executing algorithms for performing the operations described above in connection with FIG. 14. The algorithms may include operational details as described in connection with FIGS. 5 to 11 and/or FIGS. 15 to 19.

FIG. 20 shows aspects of a method 2000 for providing P2P configuration information to a UE for configuring UEs for P2P communication. The method 2000 may be performed by a base station in communication with a UE. The method 2000 may include, at 2002, the base station receiving a configuration request message from a first UE. The method 2000 may further include, at 2004, the base station providing P2P configuration information to the UE in response to the configuration request message, for example, using an RRC message or broadcast SIB transmission. The P2P configuration information may support P2P communication for UEs within the coverage of the base station. The base station may be a macro base station for a macro cell, or a home base station for a femto cell, or a base station of some other type. The first UE may perform peer discovery to detect the second UE either (i) after receiving the P2P configuration information (e.g., as shown in FIG. 3) or (ii) prior to receiving the P2P configuration information. The first UE may communicate directly with the second UE based on the P2P configuration information from the base station, using a P2P protocol, for example as summarized in connection with FIGS. 21-23 below and described in more detail herein above.

FIGS. 21-23 illustrate additional operations or aspects that may be performed in association with, or as part of, the method 2000. One or more of the additional operations 2100, 2200, and 2300 may optionally be performed as part of method 2000, or describe an aspect modifying one of the elements of the method 2000. The elements 2100, 2200, and 2300 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2000 includes at least one of the operations 2100, 2200, and 2300, then the method 2000 may terminate after the at least one operation, without necessarily having to include any subsequent downstream operation(s) that may be illustrated.

Additional operations 2100 relating to a mode for providing the P2P configuration information are shown in FIG. 21. In an embodiment of the method 2000, the operation 2004 may further include, at 2102, the base station transmitting a configuration message comprising the P2P configuration information to the UE, for example as shown at 612 in FIG. 6. In an aspect of the method 2000, the configuration request message and the configuration message may comprise RRC messages supporting P2P, as illustrated at block 2104.

Additional operations 2200 relating to a mode for providing the P2P configuration information are shown in FIG. 22, for an alternative design. In another embodiment of the method 2000, the operation 2002 may further include, at 2202, the base station broadcasting at least one SIB, for example as shown at 710 in FIG. 7. The method 2000 may further include, at 2204, the base station encoding the P2P configuration information in the at least one SIB. The base station may also provide the P2P configuration information in other manners or modes.

Additional aspects 2300 of the method 2000 are shown in FIG. 23. In one design illustrated at 2302, the P2P configuration information may convey PHY resources, or MAC resources, or both, allocated for P2P communication. In another design illustrated at 2304, the P2P configuration information may convey UE identities to use for P2P communication. In yet another design illustrated at 2306, the P2P configuration information may convey service credentials for P2P communication. The P2P configuration information may also convey other parameters.

Figure 24:
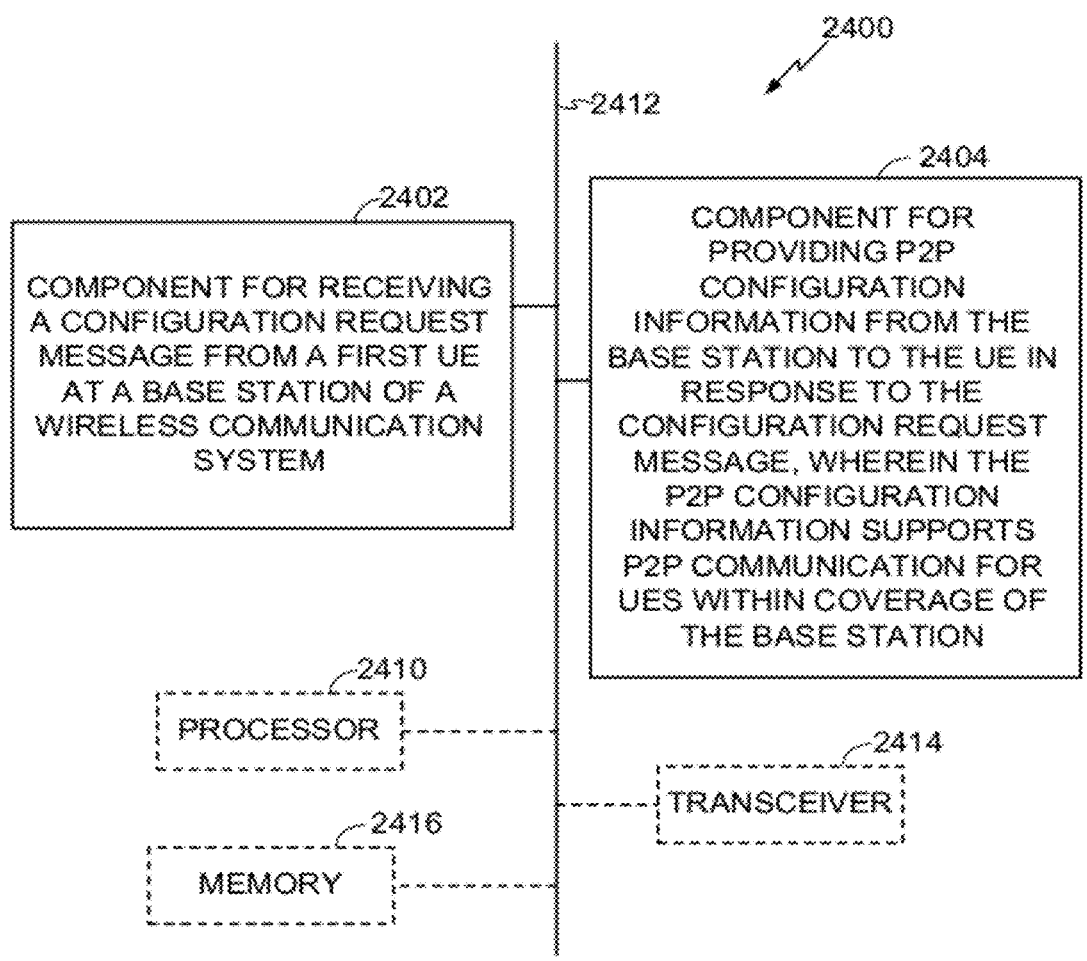
FIG. 24 is a block diagram showing aspects of an apparatus for providing configuration information for configuring a P2P link in a wireless communications system.

With reference to FIG. 24, there is provided an exemplary apparatus 2400 that may be configured as a base station/eNB in a wireless network, or as a processor or similar device for use within the base station, for configuring a P2P link of a wireless communications system. The apparatus 2400 may include functional blocks that can represent functions implemented by a processor, software, or combination thereof (e.g., firmware).

As illustrated, in one embodiment, the apparatus 2400 may include an electrical component or module 2402 for receiving a configuration request message from a first UE at a base station of a wireless communication system, wherein the P2P request is directed to information for supporting P2P communication for at least one UE within a coverage area of the base station. For example, the electrical component 2402 may include at least one control processor coupled to a network interface or the like and to a memory with instructions for communicating with a UE to receive the configuration data in a predetermined manner. The electrical component 2402 may be, or may include, a means for receiving a configuration request message from a first UE at a base station of a wireless communication system. Said means may be or may include the at least one control processor operating an algorithm. The algorithm may include receiving data by wireless transmission, recognizing the data as a P2P configuration request message based on a signal from the UE, or based on a predetermined template, and processing the request.

The apparatus 2400 may include an electrical component 2404 for providing P2P configuration information from the base station to the UE in response to the configuration request message, wherein the P2P configuration information supports P2P communication for at least one UE within a coverage area of the base station. For example, the apparatus may include a transceiver coupled to a processor operating a communication link as part of a transmitter/receiver pair. The electrical component 2404 may be, or may include, a means for providing P2P configuration information from the base station to the UE in response to the configuration request message, wherein the P2P configuration information supports P2P communication for at least one UE within coverage of the base station. Said means may be, or may include, the at least one control processor operating an algorithm. The algorithm may include obtaining and/or generating P2P configuration information based on system parameters and operating conditions, encoding the configuration information in a message, and directing the message to the UE.

The apparatus 2400 may include similar electrical components for performing any or all of the method 2000 described in connection with FIGS. 21-23, which for illustrative simplicity are not shown in FIG. 24.

In related aspects, the apparatus 2400 may optionally include a processor component 2410 having at least one processor, in the case of the apparatus 2400 configured for operation as a base station. The processor 2410, in such case, may be in operative communication with the components 2402-2404 or similar components via a bus 2412 or similar communication coupling. The processor 2410 may effect initiation and scheduling of the processes or functions performed by electrical components 2402-2404.

In further related aspects, the apparatus 2400 may include a network interface component 2414 for communicating with other network entities. The apparatus 2400 may optionally include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for performing the activity of the components 2402-2404, and subcomponents thereof, or the processor 2410, the method 1200, or the methods disclosed herein. The memory component 2416 may retain instructions for executing functions associated with the components 2402-2404. While shown as being external to the memory 2416, it is to be understood that the components 2402-2404 can exist within the memory 2416.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on as one or more instructions or code on a non-transitory computer-readable medium. Non-transitory computer-readable media includes computer storage media. A storage media may be any available medium that can be accessed by a general purpose or special purpose computer. By way of example, and not limitation, such computer-readable media may comprise RAM, ROM, EEPROM, SSD, CD-ROM, DVD, Blu-ray or other optical disk storage, magnetic disk storage or other magnetic or electronic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving peer-to-peer (P2P) configuration information from a base station at a first user equipment (UE), the P2P configuration information supporting P2P communication for UEs within coverage of the base station based on Evolved Universal Terrestrial Radio Access (E-UTRA) radio access technology without identifying the UEs;
   performing peer discovery by the first UE to detect a second UE, the peer discovery comprising detecting a peer discovery code on a proximity detection signal transmitted by the second UE advertising its availability for P2P communication; and
   communicating directly with the second UE by the first UE based on the P2P configuration information,
   wherein receiving the P2P configuration information comprises receiving at least one system information block (SIB) broadcast by the base station, and obtaining the P2P configuration information from the at least one SIB.

2. The method of claim 1, wherein receiving P2P configuration information comprises
   sending a configuration request message from the first UE to the base station, and
   receiving a configuration message comprising the P2P configuration information from the base.

3. The method of claim 2, wherein configuration request message and the configuration message comprise Radio Resource Control (RRC) messages supporting P2P.

4. The method of claim 1, wherein the P2P configuration information conveys physical layer (PHY) resources, or Medium Access Control (MAC) resources, or both allocated for P2P communication.

5. The method of claim 1, wherein the P2P configuration information conveys UE identities to use for P2P communication.

6. The method of claim 1, wherein the P2P configuration information conveys service credentials for P2P communication.

7. The method of claim 1, wherein the P2P configuration information is received by the first UE at a time selected by the first UE.

8. The method of claim 1, further comprising:
   performing peer discovery by the first UE to detect the second UE after receiving the P2P configuration information.

9. The method of claim 1, further comprising:
   performing the peer discovery by the first UE to detect the second UE prior to receiving the P2P configuration information.

10. The method of claim 1, wherein the base station is a macro base station for a macro cell.

11. The method of claim 1, wherein the base station is a home base station for a femto cell.

12. An apparatus for wireless communication, comprising:
    means for receiving peer-to-peer (P2P) configuration information from a base station at a first user equipment (UE), the P2P configuration information supporting P2P communication for UEs within coverage of the base station based on Evolved Universal Terrestrial Radio Access (E-UTRA) radio access technology without identifying the UEs;
    means for performing peer discovery by the first UE to detect a second UE, the peer discovery comprising detecting a peer discovery code on a proximity detection signal transmitted by the second UE advertising its availability for P2P communication; and
    means for communicating directly with the second UE by the first UE based on the P2P configuration information,
    wherein receiving the P2P configuration information comprises receiving at least one system information block (SIB) broadcast by the base station, and obtaining the P2P configuration information from the at least one SIB.

13. An apparatus for wireless communication, comprising at least one processor coupled to a memory, the memory holding program instructions executable by the processor to cause the apparatus to perform the operations of:
    receiving peer-to-peer (P2P) configuration information from a base station at a first user equipment (UE), the P2P configuration information supporting P2P communication for UEs within coverage of the base station based on Evolved Universal Terrestrial Radio Access (E-UTRA) radio access technology without identifying the UEs,
    performing peer discovery by the first UE to detect a second UE, the peer discovery comprising detecting a peer discovery code on a proximity detection signal transmitted by the second UE advertising its availability for P2P communication, and
    communicating directly with the second UE by the first UE based on the P2P configuration information,
    wherein receiving the P2P configuration information comprises receiving at least one system information block (SIB) broadcast by the base station, and obtaining the P2P configuration information from the at least one SIB.

14. The apparatus of claim 13, wherein the instructions for receiving P2P configuration information comprise instructions for:
    sending a configuration request message from the first UE to the base station, and
    receiving a configuration message comprising the P2P configuration information from the base station.

15. The apparatus of claim 14, wherein the configuration request message and the configuration message comprise Radio Resource Control (RRC) messages supporting P2P.

16. The apparatus of claim 13, wherein the P2P configuration information conveys physical layer (PHY) resources, or Medium Access Control (MAC) resources, or both allocated for P2P communication.

17. The apparatus of claim 13, wherein the P2P configuration information conveys UE identities to use for P2P communication.

18. The apparatus of claim 13, wherein the P2P configuration information conveys service credentials for P2P communication.

19. The apparatus of claim 13, wherein the instructions cause the P2P configuration information to be received by the first UE at a time selected by the first UE.

20. The apparatus of claim 13, wherein the memory further holds instructions for performing the peer discovery by the first UE to detect the second UE after receiving the P2P configuration information.

21. The apparatus of claim 13, wherein the memory further holds instructions for performing the peer discovery by the first UE to detect the second UE prior to receiving the P2P configuration information.

22. A computer program product, comprising:
a non-transitory computer-readable medium comprising:
code for causing at least one processor to receive peer-to-peer (P2P) configuration information from a base station at a first user equipment (UE) in response to the configuration request message, the P2P configuration information supporting P2P communication for UEs within coverage of the base station based on Evolved Universal Terrestrial Radio Access (E-UTRA) radio access technology without identifying the UEs,
code for causing the at least one processor to perform peer discovery by the first UE to detect a second UE, the peer discovery comprising detecting a peer discovery code on a proximity detection signal transmitted by the second UE advertising its availability for P2P communication, and
code for causing the at least one processor to communicate directly with the second UE by the first UE based on the P2P configuration information,
wherein receiving the P2P configuration information comprises receiving at least one system information block (SIB) broadcast by the base station, and obtaining the P2P configuration information from the at least one SIB.

23. A method for wireless communication, comprising:
receiving a configuration request message from a first user equipment (UE) at a base station of a wireless communication system; and
providing peer-to-peer (P2P) configuration information from the base station to the first UE in response to the configuration request message, wherein the P2P configuration information supports P2P communication for at least one UE within coverage of the base station based on Evolved Universal Terrestrial Radio Access (E-UTRA) radio access technology without identifying the at least one UE, wherein the P2P configuration information specifies resources allocated to the first UE for peer discovery comprising detecting a peer discovery code on a proximity detection signal from the at least one other UE that advertises availability of the at least one other UE for P2P communication,
wherein providing the P2P configuration information comprises broadcasting at least one system information block (SIB); and encoding the P2P configuration information in the at least one SIB.

24. The method of claim 23, wherein providing the P2P configuration information comprises transmitting a configuration message comprising the P2P configuration information from the base station.

25. The method of claim 24, wherein configuration request message and the configuration message comprise Radio Resource Control (RRC) messages supporting P2P.

26. The method of claim 23, wherein the P2P configuration information conveys physical layer (PHY) resources, or Medium Access Control (MAC) resources, or both allocated for P2P communication.

27. The method of claim 23, wherein the P2P configuration information conveys UE identities to use for P2P communication.

28. The method of claim 23, wherein the P2P configuration information conveys service credentials for P2P communication.

29. An apparatus for wireless communication, comprising:
means for receiving a configuration request message from a first user equipment (UE) at a base station of a wireless communication system; and
means for providing peer-to-peer (P2P) configuration information from the base station to the first UE in response to the configuration request message, wherein the P2P configuration information supports P2P communication for at least one UE within coverage of the base station based on Evolved Universal Terrestrial Radio Access (E-UTRA) radio access technology without identifying the at least one UE, wherein the P2P configuration information specifies resources allocated to the first UE for peer discovery comprising detecting a peer discovery code on a proximity detection signal from the at least one other UE that advertises availability of the at least one other UE for P2P communication,
wherein providing the P2P configuration information comprises broadcasting at least one system information block (SIB); and encoding the P2P configuration information in the at least one SIB.

30. An apparatus for wireless communication, comprising:
at least one processor coupled to a memory, the memory holding program instructions executable by the processor to cause the apparatus to perform the operations of:
receiving a configuration request message from a first user equipment (UE) at a base station of a wireless communication system; and
providing peer-to-peer (P2P) configuration information from the base station to the first UE in response to the configuration request message, wherein the P2P configuration information supports P2P communication for at least one UE within coverage of the base station based on Evolved Universal Terrestrial Radio Access (E-UTRA) radio access technology without identifying the at least one UE, wherein the P2P configuration information specifies resources allocated to the first UE for peer discovery comprising detecting a peer discovery code on a proximity detection signal from the at least one other UE that advertises availability of the at least one other UE for P2P communication,
wherein providing the P2P configuration information comprises broadcasting at least one system information block (SIB); and encoding the P2P configuration information in the at least one SIB.

31. The apparatus of claim 30, wherein the instructions for providing the P2P configuration information are further configured for causing the apparatus to transmit a configuration message comprising the P2P configuration information from the base station.

32. The apparatus of claim 31, wherein the instructions are configured for handling the configuration request message and the configuration message as Radio Resource Control (RRC) messages supporting P2P.

33. The apparatus of claim 30, wherein the P2P configuration information conveys physical layer (PHY) resources, or Medium Access Control (MAC) resources, or both allocated for P2P communication.

34. The apparatus of claim 30, wherein the P2P configuration information conveys UE identities to use for P2P communication.

35. The apparatus of claim 30, wherein the P2P configuration information conveys service credentials for P2P communication.

36. A computer program product, comprising:
 a non-transitory computer-readable medium comprising encoded instructions for:
 receiving a configuration request message from a first user equipment (UE) at a base station of a wireless communication system; and
 providing peer-to-peer (P2P) configuration information from the base station to the first UE in response to the configuration request message, wherein the P2P configuration information supports P2P communication for at least one UE within coverage of the base station based on Evolved Universal Terrestrial Radio Access (E-UTRA) radio access technology without identifying the at least one UE, wherein the P2P configuration information specifies resources allocated to the first UE for peer discovery comprising detecting a peer discovery code on a proximity detection signal from the at least one other UE that advertises availability of the at least one other UE for P2P communication,
 wherein providing the P2P configuration information comprises broadcasting at least one system information block (SIB); and encoding the P2P configuration information in the at least one SIB.

\* \* \* \* \*